(12) United States Patent
Nyberg

(10) Patent No.: US 11,515,052 B1
(45) Date of Patent: Nov. 29, 2022

(54) REACTOR CONTAINMENT OUTER STRUCTURAL SHELL

(71) Applicant: Gary James Nyberg, Homosassa, FL (US)

(72) Inventor: Gary James Nyberg, Homosassa, FL (US)

( * ) Notice: Subject to any disclaimer, the term of this patent is extended or adjusted under 35 U.S.C. 154(b) by 0 days.

(21) Appl. No.: 16/052,244

(22) Filed: Aug. 1, 2018

Related U.S. Application Data

(63) Continuation of application No. 15/179,329, filed on Jun. 10, 2016, now abandoned.
(60) Provisional application No. 62/230,711, filed on Jun. 11, 2015.

(51) Int. Cl.
*G21C 13/024* (2006.01)

(52) U.S. Cl.
CPC ............ *G21C 13/024* (2013.01); *Y02E 30/30* (2013.01)

(58) Field of Classification Search
CPC ....... G21C 13/024; Y02E 30/40; Y02E 30/30; B65D 88/128; B65D 90/12; F17C 2203/011; F17C 2260/011
See application file for complete search history.

(56) References Cited

U.S. PATENT DOCUMENTS

| | | | | |
|---|---|---|---|---|
| 3,929,566 A * | 12/1975 | Noyes | ..................... | G21C 1/028 376/277 |
| 3,935,957 A * | 2/1976 | Hasegawa | ............... | F17C 3/022 220/560.1 |
| 3,963,936 A * | 6/1976 | Lowe | .................... | G21C 11/024 250/517.1 |
| 4,192,718 A * | 3/1980 | Janakiev | ................... | F16J 12/00 376/294 |
| 4,458,458 A * | 7/1984 | Orii | ....................... | B65D 90/043 220/694 |
| 4,797,247 A * | 1/1989 | Blaushild | ............... | G21C 11/00 220/283 |
| 5,217,681 A * | 6/1993 | Wedellsborg | .......... | G21C 13/10 220/560.01 |
| 5,268,944 A * | 12/1993 | Ekeroth | ................. | G21C 11/08 376/289 |
| 5,600,689 A * | 2/1997 | Weems | ................... | G21C 17/01 376/302 |
| 9,546,495 B2 * | 1/2017 | Shiomi | .................... | E04H 7/065 |
| 2004/0134144 A1 * | 7/2004 | Morrison | .................. | E04H 7/18 52/245 |
| 2006/0037278 A1 * | 2/2006 | Crane | ....................... | E04H 7/18 52/745.01 |
| 2007/0253521 A1 * | 11/2007 | Mitchell | ................. | F16G 13/00 376/383 |
| 2008/0302804 A1 * | 12/2008 | Simmons | ................ | F17C 3/022 220/560.05 |

(Continued)

*Primary Examiner* — Michael C Zarroli
(74) *Attorney, Agent, or Firm* — Christopher Mayle

(57) ABSTRACT

A system of Structural Members that interconnect or attach to each other to create an Outer Structural Shell to strengthen and protect against failure of Reactor Containment/Shield Buildings and other concrete structures or supports such as pillars, columns and piers. When interconnected, the Structural Members are tensioned to create a protective Outer Structural Shell to contain and restrict degraded or cracked concrete from further cracking and eventual delamination, by applying a supportive compression force to outer concrete wall(s) and surfaces.

13 Claims, 20 Drawing Sheets

(56) References Cited

U.S. PATENT DOCUMENTS

2010/0278294 A1\* 11/2010 Kwon .................... G21C 13/02
376/282
2016/0141054 A1\* 5/2016 No ......................... G21C 9/016
376/280

\* cited by examiner

Reactor Containment
PRIOR ART

Fig.1 Reactor Containment Horizontal Tendon ●
PRIOR ART

REACTOR CONTAINMENT OUTER STRUCTURAL SHELL

This application is a continuation of application Ser. No. 15/179,329 filed Jun. 10, 2016 which claimed the benefit of U.S. Provisional Application 62/230,711, filed Jun. 11, 2015, entitled: Reactor Containment Outer Structural Shell. Applications 15/179,329 and 62/230,711 are hereby incorporated by reference in their entirety.

BACKGROUND OF THE INVENTION

Field of the Invention

The present invention relates generally to reactor containment buildings and more particularly to non-obtrusive configurable versatile Structural Members that interconnect or attach to each other to create an Outer Structural Shell to strengthen and protect against failure of Reactor Containment/Shield Buildings and other round, curved or cylindrical concrete structures such as off-gas, smoke and exhaust stacks or supports such as pillars, columns and piers.

Description of the Problem Solved

The Reactor Containment/Shield Building is a safety Class 1 Structure with steel liner wherein its primary function is to house the primary nuclear system and provide biological shielding from fission products that may become airborne under accident conditions. Its failure could result in the uncontrolled release of harmful radioactive elements and its integrity is vital for the safe shutdown and isolation of the reactor to protect the health and safety of the public.

At Crystal River Unit 3 (CR3) a 25'×27' access opening was created in 2009 by de-tensioning and removing both horizontal and vertical steel Tendons in the vicinity of the opening and cutting a whole thru the Reactor Containment wall structure to replace the Steam Generators. While creating the opening, workers discovered an unexpected crack, or separation inside the concrete wall. They noticed a gap between the outer 10 inches of concrete and the inner 32 inches of concrete. This gap has also been referred to as a delamination. After further excavation of the concrete wall, workers reached the steel liner. The liner was intact and undamaged. The 32 inches of concrete outside the steel liner also appeared unaffected by the delamination.

On Jun. 30, 2010 Progress Energy (owner) initially identified that the root cause of the delaminated outside 10 inches of concrete on the Reactor Containment wall, was the result of the limited scope and sequence of de-tensioning the pre-stressed post-tensioning system of vertical and horizontal steel containment tendons. A contributing cause of added stress was attributed to removing concrete at the SGR opening. Crack widths between 500 and 4000 mils developed along the Horizontal/Hoop post-tension Tendons (8-9 inches from the exterior face) that subsequently have been determined to be from pre-stressing forces, lack of transverse shear reinforcement and weak aggregate.

Restoration of the Reactor Containment Structure Shell was attempted by installation of tendon sheaths, tendons, rebar and concrete within the boundaries of the removed concrete. However, during re-tensioning sequences of the newly constructed concrete shell in 2011, at least (2) additional cracks occurred in other sections of the Containment wall, that were heard around the world and eventually caused CR3 to be permanently shut down because a cost effective and viable repair solution for the Reactor Containment Structure could not be found.

Preliminary cost estimates for repairs by Progress Energy were estimated between $900 million and $1.3 billion, but this estimate was later called into question by CR3's unfortunate new part owner Duke Energy in October 2012 when an independent review estimated the repair cost at $1.5 billion, to a worst-case scenario of $3.4 billion. As a result, in February 2013 Duke Energy announce that CR3 would be permanently shut down.

Loads considered in verifying the structural integrity of the Containment Building include loads resulting from natural phenomena such as earthquakes, tornados, wind and hurricanes, loads resulting from Design Basis Accident (DBA) conditions, dead live loads, loads resulting from Tendon stressing, and the dead weight of the Polar Crane inside of the Containment Structure. The innovative Outer Structural Shell Member (OSSM) designs in this invention can both restore and improve the structural integrity of the Reactor Containment Structure.

The CR3 Reactor Containment Structure is similar in design to the containment buildings for the Three Mile Island Nuclear Station Unit 1, the Turkey Point Plant, the Palisades Plant, the Point Beach Plant, and the Oconee Nuclear Station. Therefore, the properties and concepts of this invention may also be applied to structurally strengthen comparable Reactor Containment Structures as required.

This invention can also provide viable solutions for concrete degradations identified in the reinforced concrete Shield Building wall at Davis Besse and Seabrook Station's Containment Building.

SUMMARY OF THE INVENTION

This invention comprises non-obtrusive configurably versatile Structural Members that interconnect or attach to each other to create an Outer Structural Shell to strengthen and protect against failure of Reactor Containment/Shield Buildings and other round or semi-round cylindrical concrete structures or supports such as pillars, columns and piers. When interconnected, the Structural Members are tensioned to create a protective Outer Structural Shell to contain and restrict degraded or cracked concrete from further cracking and eventual delamination, by applying a supportive circumferential compression force to outer concrete wall(s) and surfaces. They enhance the strength of structures to withstand dead live loads, dead weight loads and abnormal loads resulting from natural phenomena such as earthquakes, tornados, wind and hurricanes. They enhance structural shielding, counter accelerated seismic loads from the maximum postulated Safe Shutdown Earthquake (SSE) and withstand the effects of the maximum postulated Design Basis Accident.

BRIEF DESCRIPTION OF THE DRAWINGS

The following Figures portray various parts of OSSMs that enable them to interact and create a protective Outer Structural Shell around a concrete Reactor Containment or Shield Building Structure. OSSMs illustrated in FIGS. 1 and 2 may also be used to create a protective Outer Structural Shell that strengthens concrete Off-Gas, Smoke and Exhaust Stacks and structural members such as piers, columns and pillars that degrade from adverse chemical reactions between alkali aggregates and embedded metals making them vulnerable to cracks and delamination.

Currently, there are no Figures provided that illustrate Off-Gas, Smoke and Exhaust Stacks or Reactor Containment Structures without external Buttresses to anchor Tendons but instead have a relatively smooth outside rounded concrete surface. The interconnecting features of the OSSMs presented herein also lend themselves to wrap completely around the outside of a structure and tensioned in whatever intervals desired in a similar way as represented in Figures land 19. If necessary, more Figures could be created in the future to show a wall without buttresses with various OSSMs in tensioned combinations wrapped about that provide a continuous compression force to the outside of the structure. Therefore, the descriptions for many of the interconnecting parts herein also apply to Reactor Building Containment and other structures and supports that do not utilize external Buttresses to support Tendons as a means for structural integrity.

Figure 1:
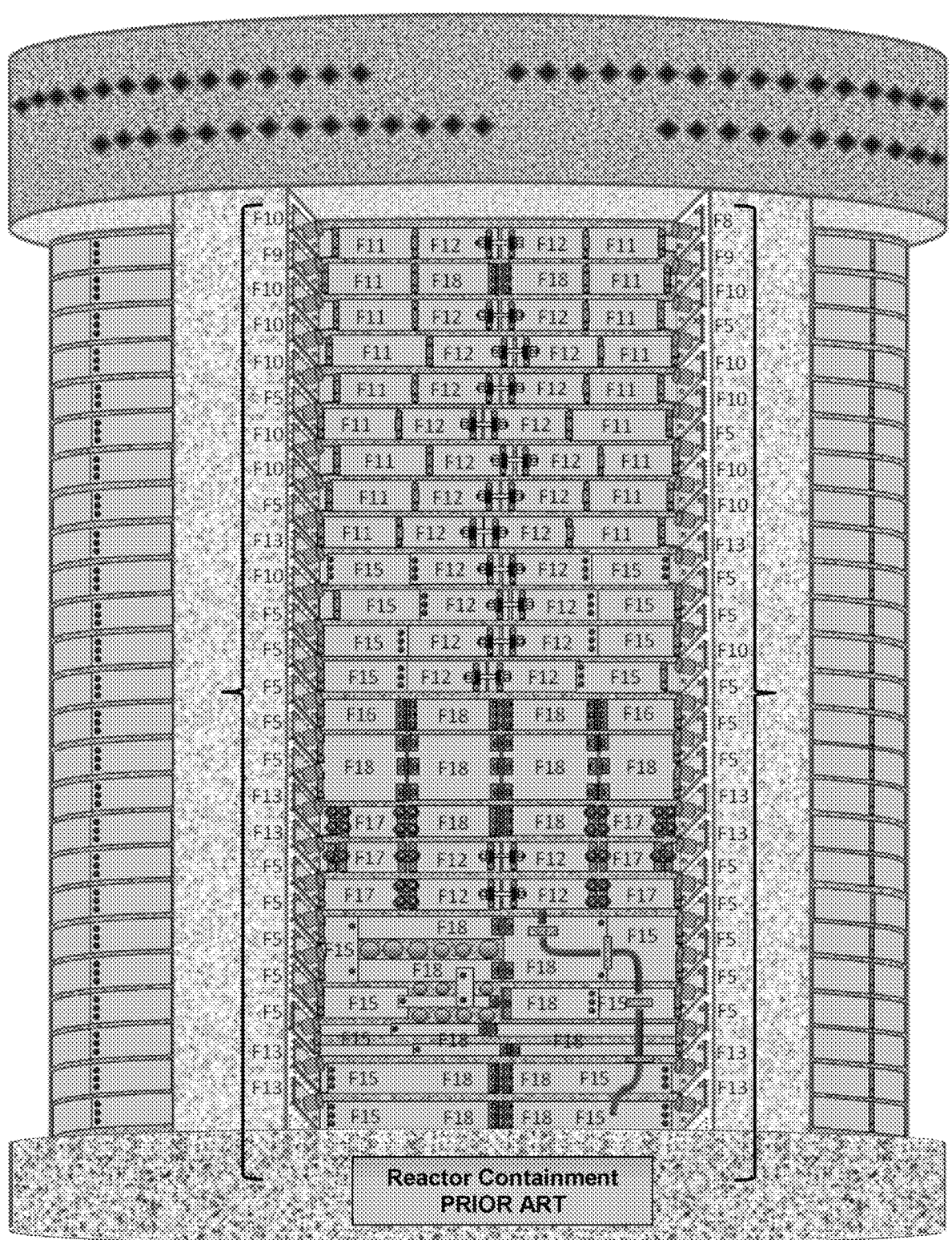
FIG. 1 illustrates many different configurations and combinations of preferred embodiments as an example of how they may be configured to provide a desired result. Each combination of OSSM parts in FIG. 1 is not intended to represent a requirement or preference to any one-of or group-of OSSM configurations or combinations. That is left to end user preference. The diverse selection of OSSM parts are designed to allow versatile configurations to be assembled to overcome complex challenges encountered in the field by the end user. The figures represent versatility of the invention to enable an end user to envision practical and cost-effective application.

FIG. 1—represents a Reactor Containment Structure with protruding vertical Buttresses embedded within a concrete wall that anchor Horizontal/Hoop Tendons in concrete that apply tensioned circumferential compression force to the inner Containment wall structure. FIG. 1 also illustrates various configurations and combinations of preferred embodiments that correlate to the Figures by number reference (F XX), to illustrate the function of various OSSM parts.

Figure 2:
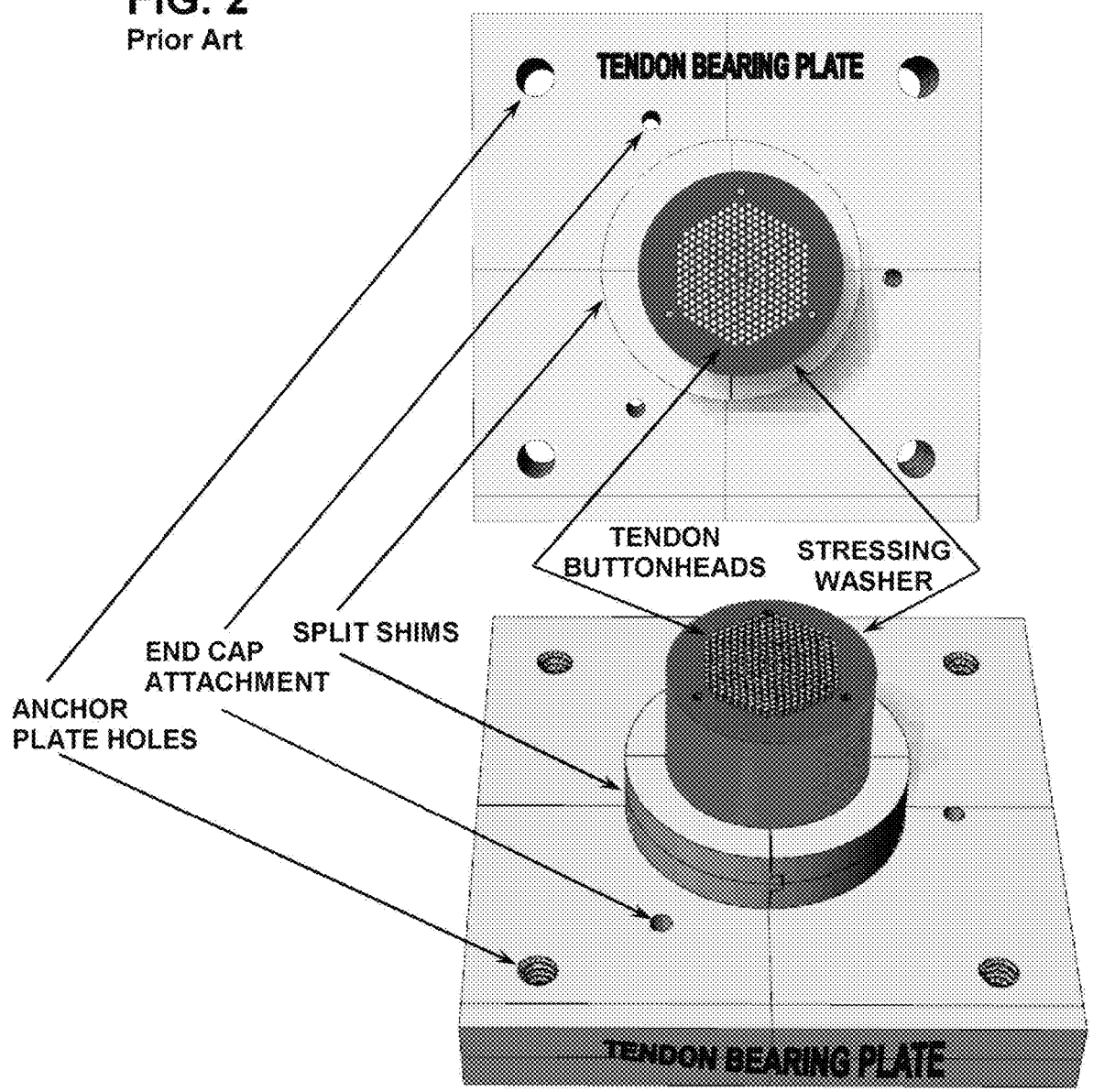

FIG. 2—represents a Prior Art Tendon and Bearing Plate Assembly illustrating front and side views of the Tendon Tensioning Stressing Washer, Split Shims, Tendon Buttonheads, Tendon Bearing Plate and attachment points for an End Cap Cover and holes that enable anchoring innovative Tendon Bearing Anchor Plates (TBAP) (Part Nos. 1, 10 or 13) and rigging a conventional Hydraulic Jack Tendon Tensioner.

Figure 3:
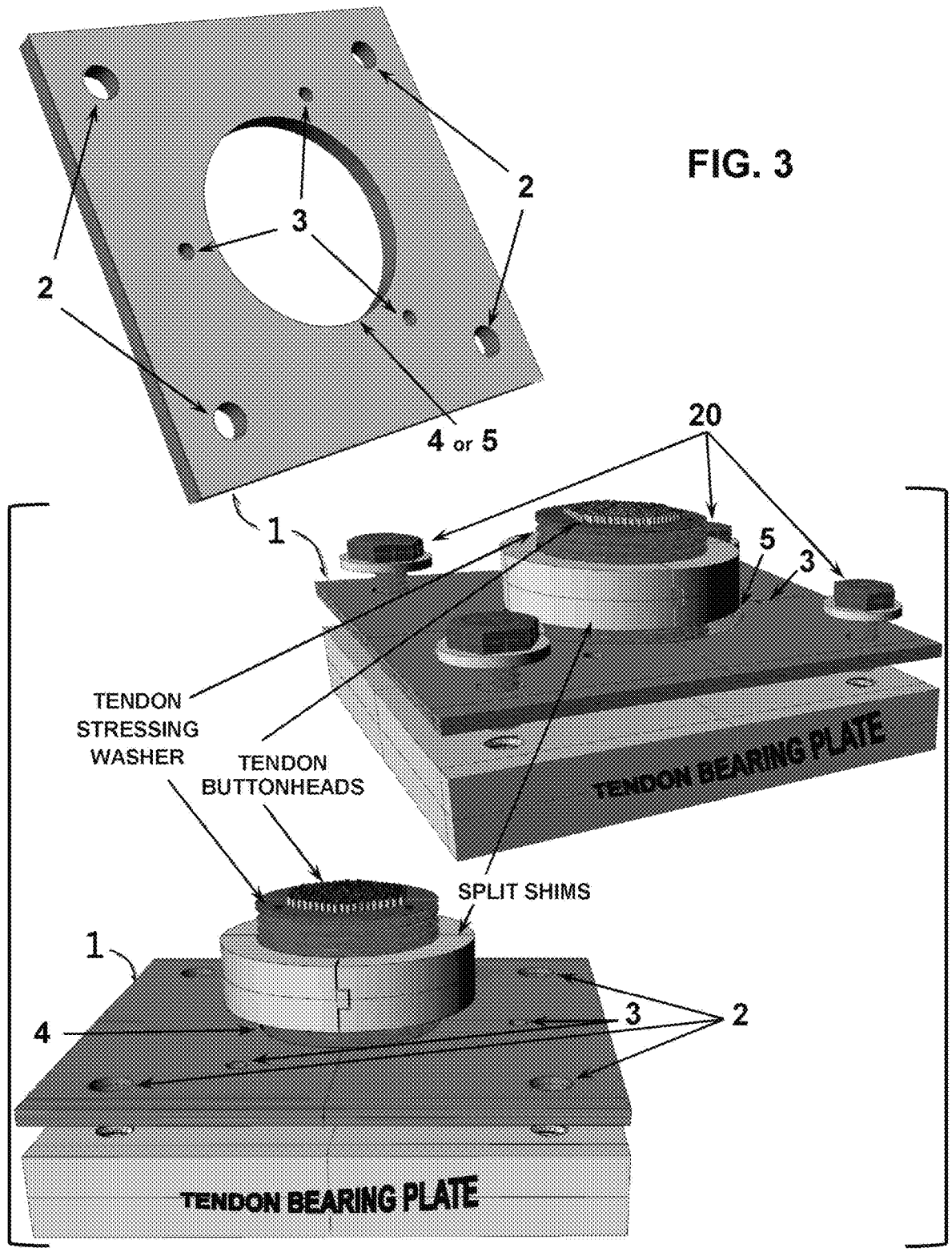

FIG. 3—presents an OSSM TBAP (P/N 1) with Tendon Bearing Holes (P/N 2) that allow TBAP attachment to a Tendon Bearing Plate with Tendon Bearing Anchor Plate Attachment Bolt Assembly (TBAPABA) (P/N 20). The figure illustrates how a TBAP with Stressing Washer Center Hole (P/N 4) sized to fit around a Stressing Washer under Split Shims, enables another attachment point and becomes an integral shim to a Tendon assembly when it is re-tensioned. The figure also illustrates how a TBAP with a Split Shims Center Hole (P/N 5) can be attached prior to Tendon assembly re-tensioning. The detail shows Bearing Cap Hole(s) (P/N 3) for fastening an End Cap to protect the Tendon Bearing Assembly.

Figure 4:
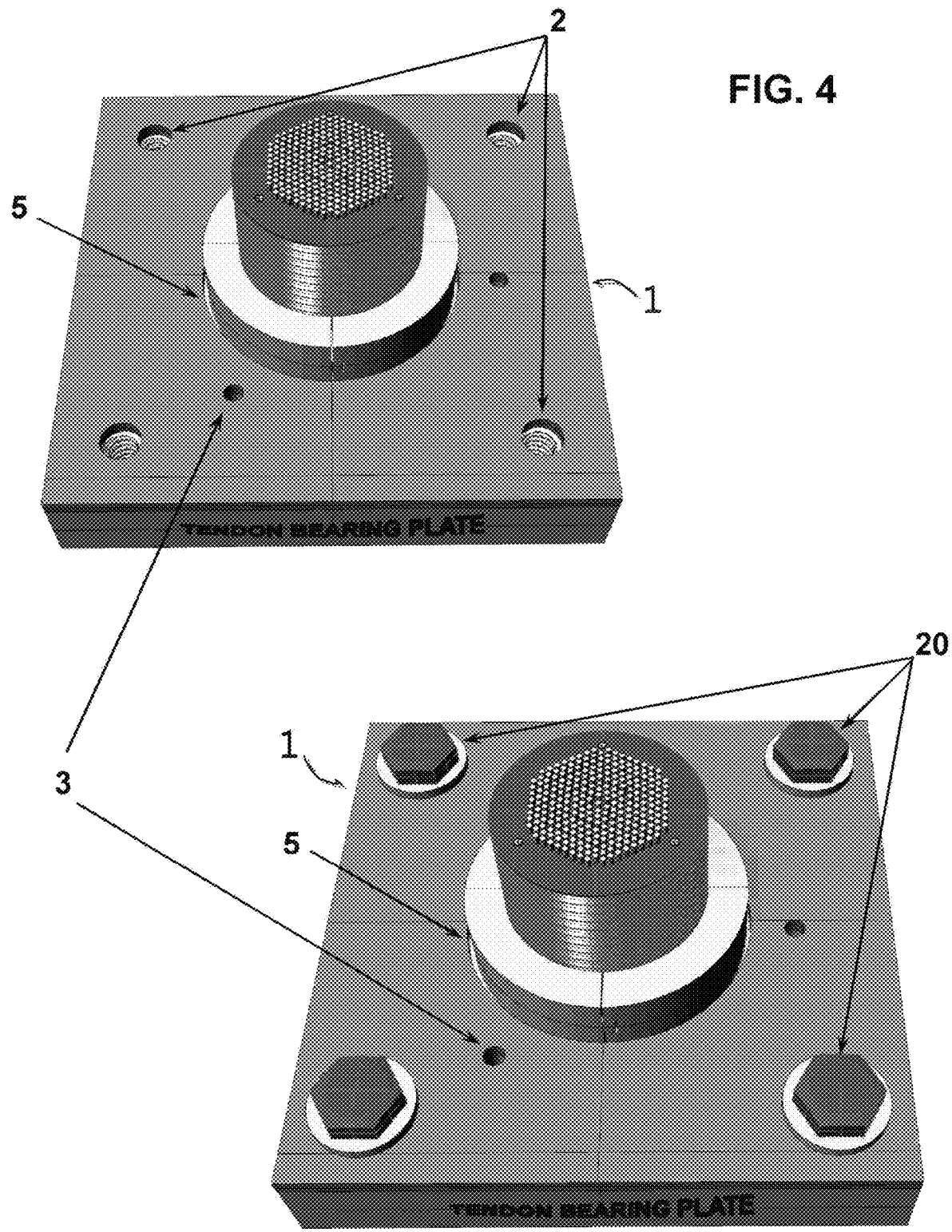

FIG. 4—illustrates how an OSSM TBAP (P/N 1) with Split Shims Center Hole (P/N 5) can be attached to a Tendon Bearing Plate with TBAPABA (P/N 20) without de-tensioning a Horizontal/Hoop Tendon assembly.

Figure 5:
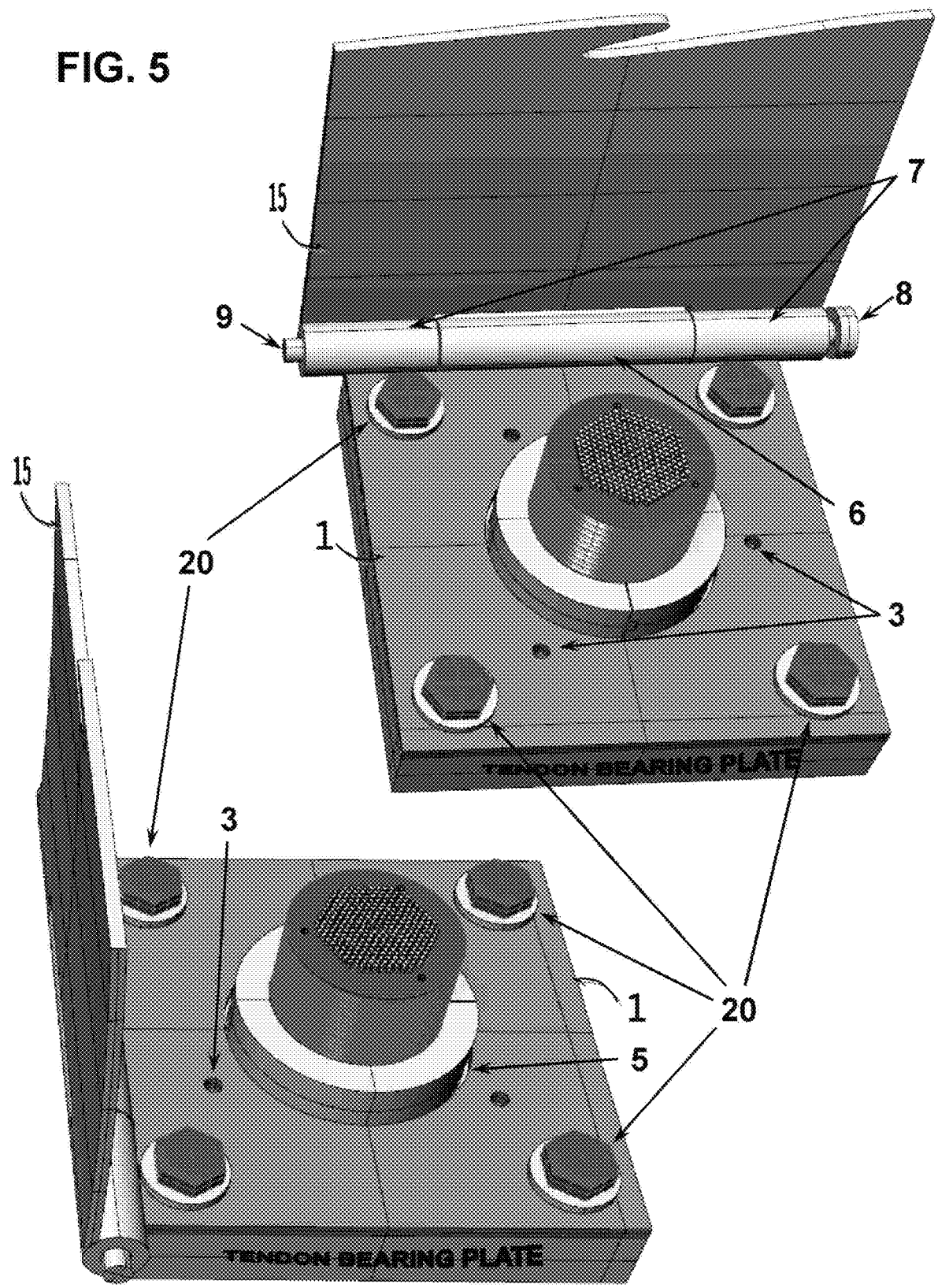

FIG. 5—presents front and side views of an OSSM TBAP (P/N 1) Split Shims Center Hole (P/N 5) that is fastened to a Tendon Bearing Plate with TBAPABA (P/N 20) without de-tensioning a Horizontal/Hoop Tendon assembly. The TBAP is constructed with a Heavy Wall Hinge Support (HWHS) (P/N 6) pivotally connected by Pivot Pin (P/N 9) to a perpendicularly flat OSSM Compression Strap (P/N 15). The Compression Strap fabricated with a pre-formed arc profile along its length is constructed with (2) Heavy Wall Pivot Supports (HWPSs) (P/N 7) that align with the HWHS and provide a movable attachment that allows CSAs to conform to and swing away from a concrete wall for ease of installation and periodic inspections (FIG. 1).

Figure 6:
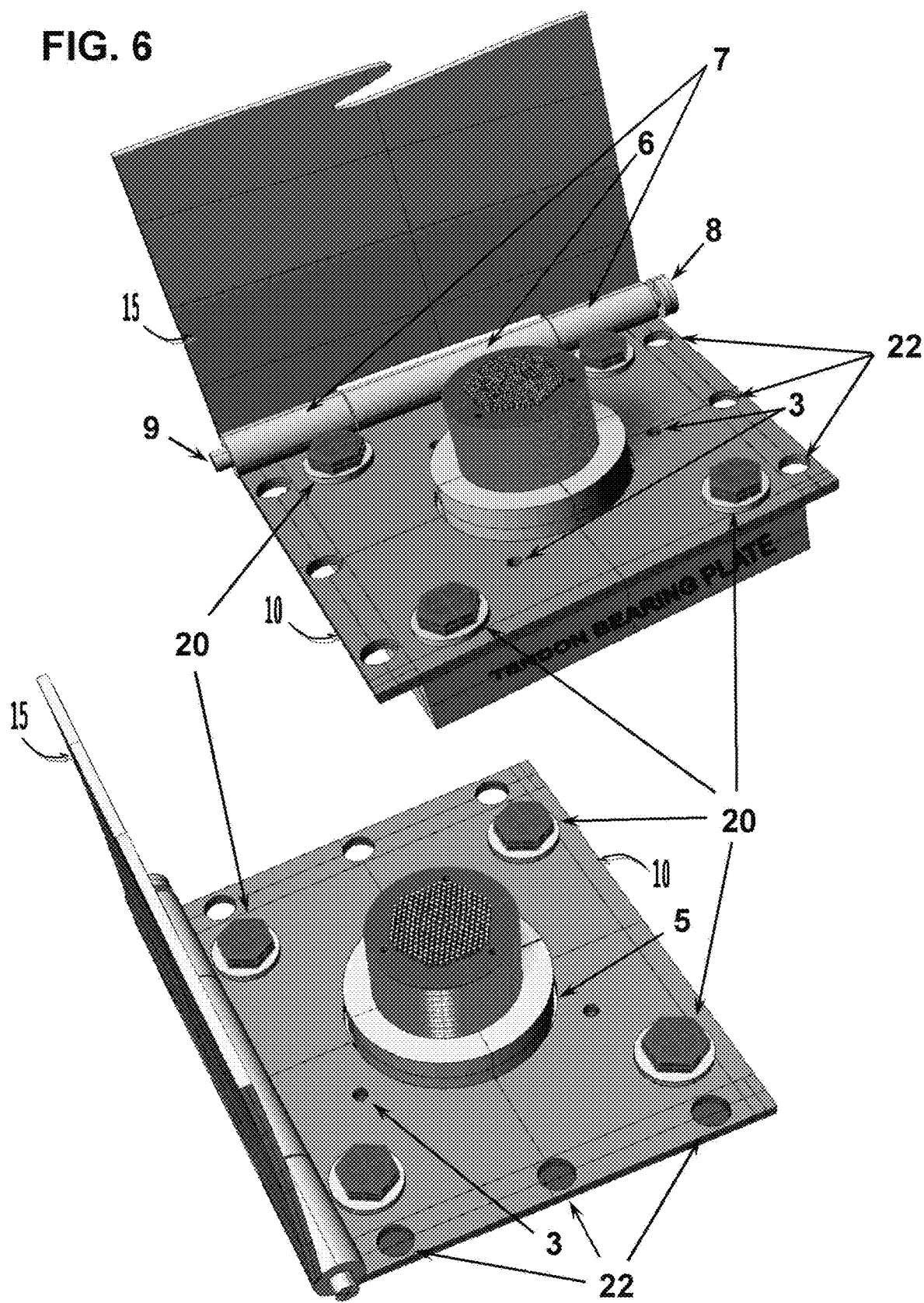

FIG. 6—presents front and side views of an OSSM Wide Tendon Bearing Anchor Plate (WTBAP) (P/N 10) Split Shims Center Hole (P/N 5) that is fastened to a Tendon Bearing Plate with TBAPABA (P/N 20) without de-tensioning a Horizontal/Hoop Tendon assembly. The WTBAP is constructed with a HWHS (P/N 6) pivotally connected by Pivot Pin (P/N 9) to a perpendicularly flat OSSM Compression Strap (P/N 15). The Compression Strap fabricated with a pre-formed arc profile along its length is constructed with (2) HWPSs (P/N 7) at an end that aligns with the HWHS to provide a movable attachment that allows Compression Strap Assemblies (CSAs) to conform to and swing away from a concrete wall for ease of installation and periodic inspections. The OSSM WTBAP has Anchor Holes along the outside edges that extend beyond a Tendon Bearing Plate that enables it to be fastened and anchored directly to the Buttress via embedded anchor assembly.

Figure 7:
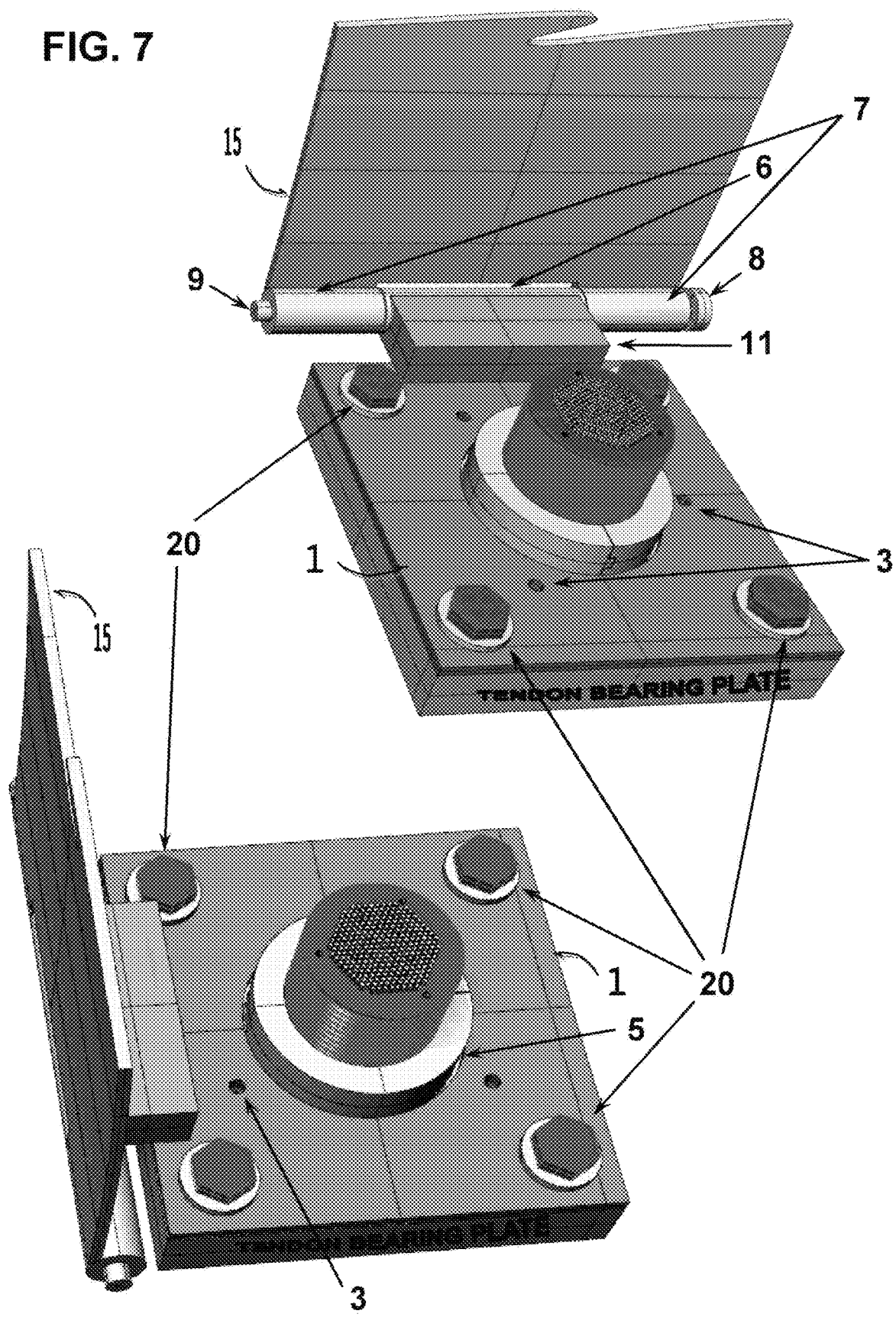

FIG. 7—presents front and side views of an OSSM TBAP (P/N 1) Split Shims Center Hole (P/N 5) that is fastened to a Tendon Bearing Plate with TBAPABA (P/N 20) without de-tensioning a Horizontal/Hoop Tendon assembly. The TBAP is constructed with a Hinge Support Extension Block (HSEB) (P/N 11) that extends an attached HWHS (P/N 6) pivotally connected by Pivot Pin (P/N 9) to a perpendicularly flat OSSM Compression Strap (P/N 15). The Compression Strap fabricated with a pre-formed arc profile along its length is constructed with (2) HWPSs (P/N 7) that align with the extended HWHS to provide a movable attachment that allows CSAs to conform to and swing away from a concrete wall for ease of installation and periodic inspections.

Figure 8:
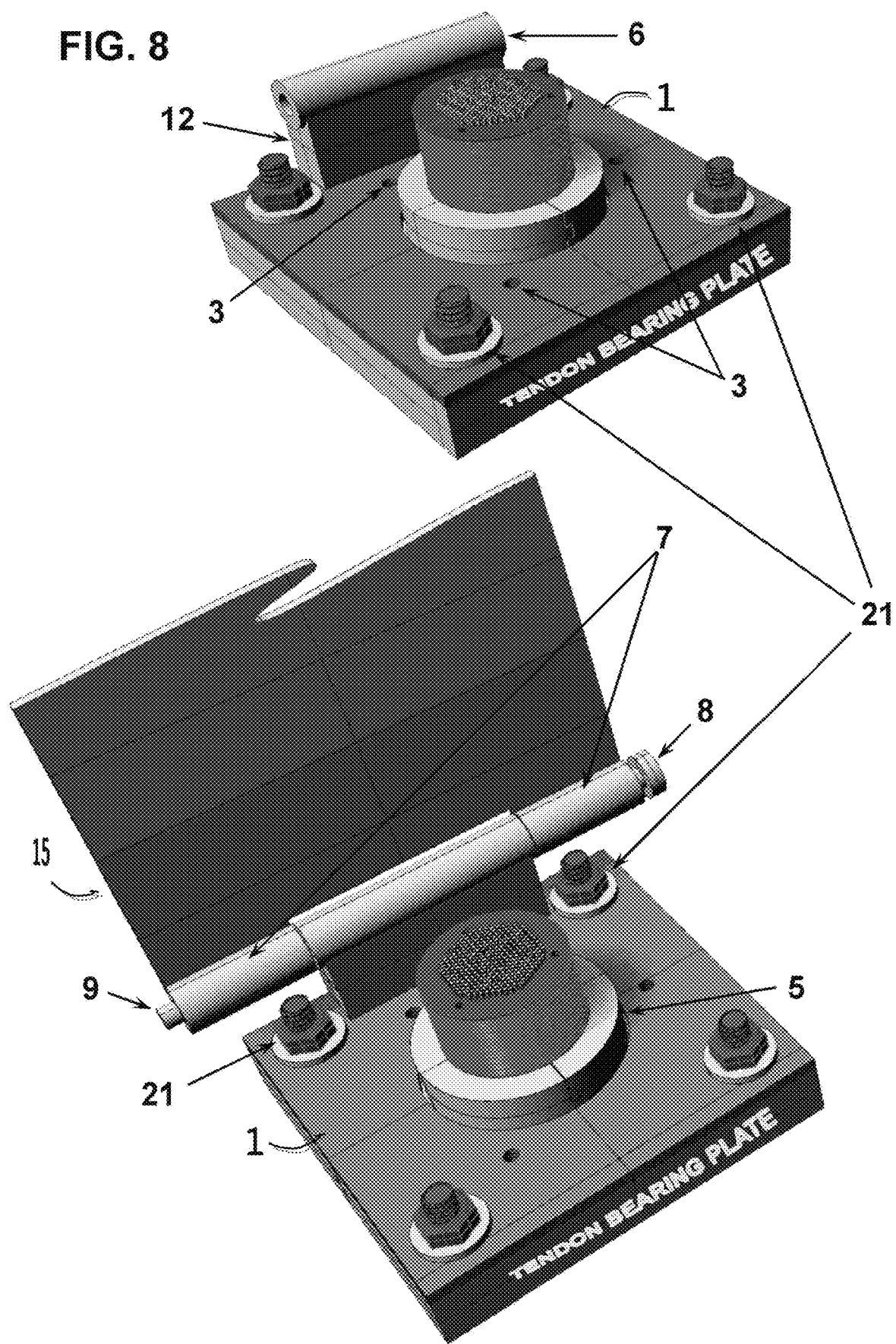

FIG. 8—presents an OSSM TBAP (P/N 1) Split Shims Center Hole (P/N 5) that is fastened to a Tendon Bearing Plate with a Tendon Bearing Anchor Plate Stud Assembly (TBAPSA) (P/N 21) without de-tensioning a Horizontal/Hoop Tendon assembly. The TBAP is constructed with a Raised Hinge Support Block (RHSB) (P/N 12) that raises an attached HWHS (P/N 6) that is pivotally connected by Pivot Pin (P/N 9) to a perpendicularly flat OSSM Compression Strap (P/N 15). The Compression Strap is fabricated with a pre-formed arc profile along its length and constructed with (2) HWPSs (P/N 7) that align with the raised HWHS to provide a movable attachment that allows similar configured CSAs to be offset from TBAPs configured with the HWHS attached to the TBAP, illustrated in FIGS. 4 and 5. The raised HWHS on the RHSB raises CSAs above the TBAP and TBAPSAs and eases Hinge Pin installation and removal for attachment of CSAs, and allows them to conform to and swing away from a concrete wall for ease of installation and periodic inspections (FIG. 1).

Figure 9:
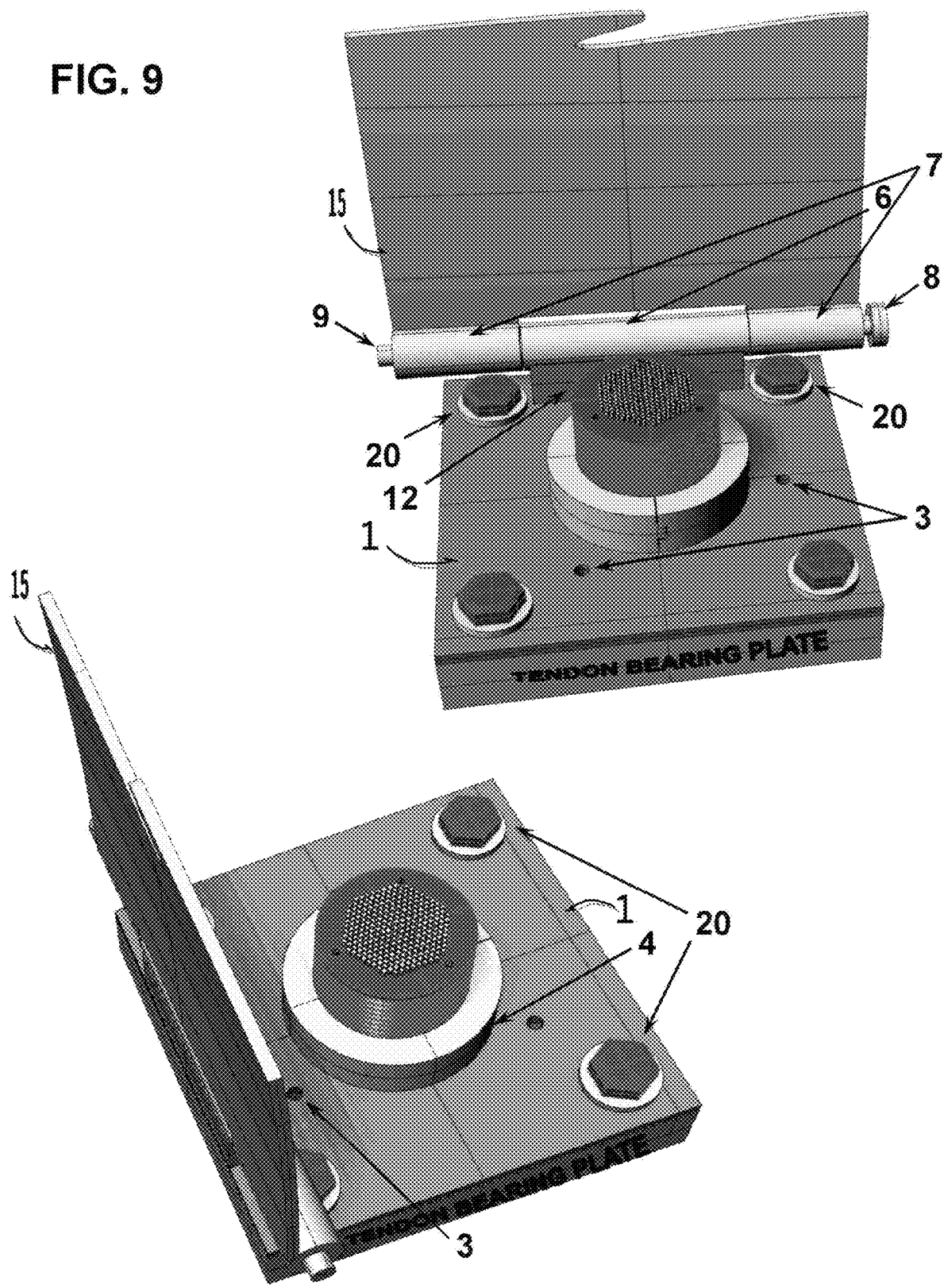

FIG. 9—presents front and side views of an OSSM TBAP (P/N 1) constructed with a Stressing Washer Center Hole (P/N 4) sized to fit around the Tendon Stressing Washer and fastened to the TBAP under the Split Shims by the re-tensioned Horizontal/Hoop Tendon assembly. The TBAP is also fastened to a Tendon Bearing Plate with TBAPABA (P/N 20).

Similar to FIG. 8, the TBAP is constructed with a short RHSB (P/N 12) that raises a HWHS (P/N 6) that is pivotally connected by Pivot Pin (P/N 9) to a perpendicularly flat OSSM Compression Strap (P/N 15). The Compression Strap fabricated with a pre-formed arc profile along its length is constructed with (2) HWPSs (P/N 7) at an end that aligns with the raised HWHS. The configuration provides a movable attachment that allows similar configured CSAs to be offset from TBAPs configured with the HWHS attached to the TBAP and, the raised RHSB HWHS combination, illustrated in FIGS. 5 and 8. The raised HWHS on the RHSB raises CSAs above the TBAP and TBAPABAs, and eases Hinge Pin installation and removal for attachment of CSAs, and allows them to conform to and swing away from a concrete wall for ease of installation and periodic inspections (FIG. 1).

Figure 10:
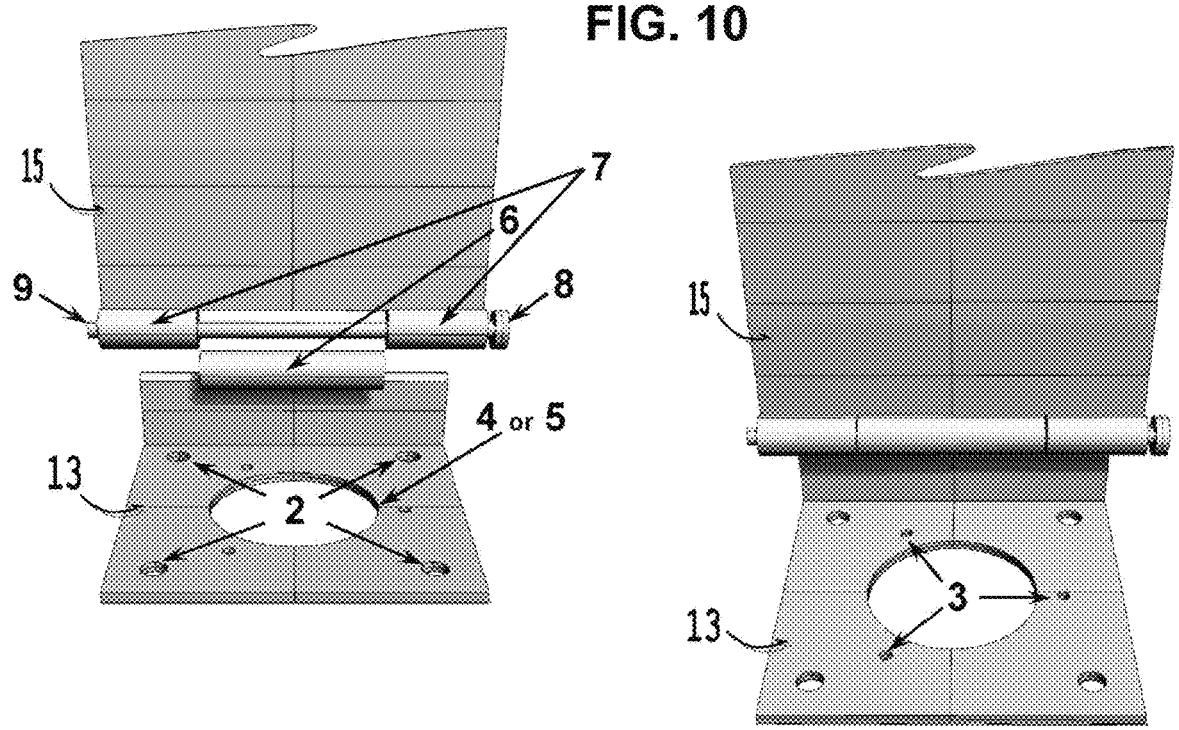
Figure 10:
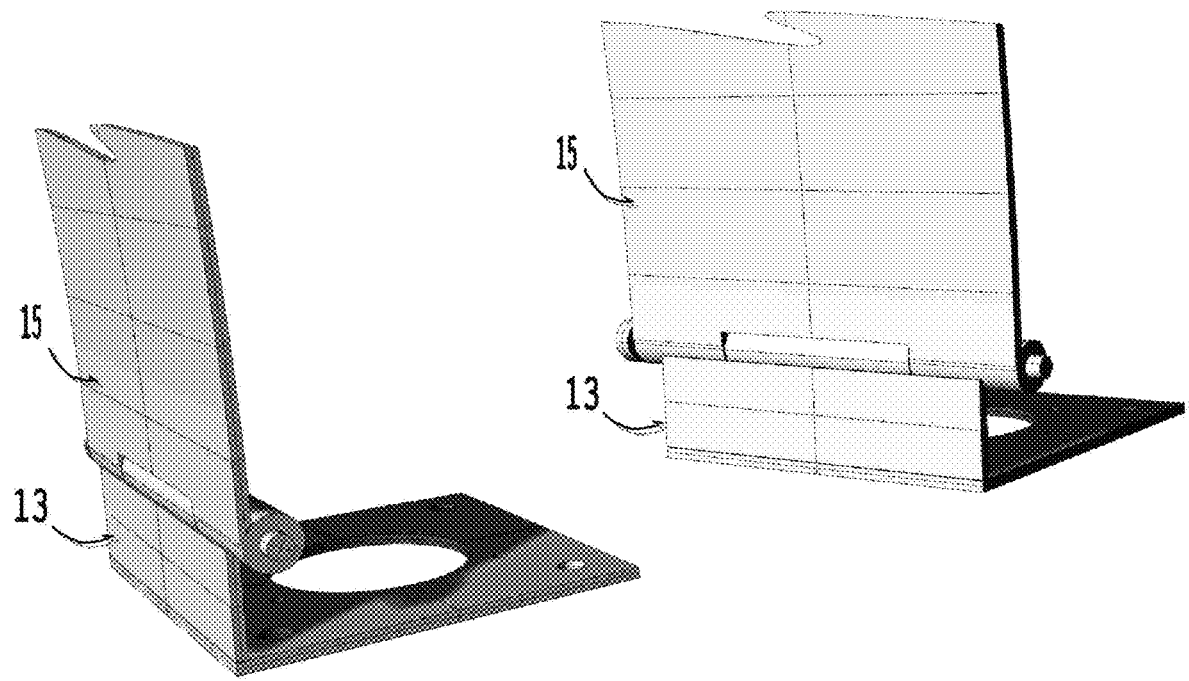

FIG. 10—presents front, side and back views of an OSSM ATBAP (P/N 13) designed to anchor CSA Structural Strap Segments to the top of the Tendon Bearing Plate. Similar to TBAPs, ATBAPs can be constructed with a Stressing Washer Center Hole (P/N 4) sized to fit around a Stressing Washer, thus reducing the number of shims required for Tendon tensioning and providing another means for attachment to the Tendon Bearing Plate. ATBAPs can also be constructed with a Split Shims Center Hole (P/N 5) sized to fit around the outside of the Tendon Split Shims enabling an ATBAP to be attached to the Tendon Bearing Plate without de-tensioning or re-tensioning a Horizontal/Hoop Tendon assembly.

The ATBAP is constructed with Tendon Bearing Plate Hole(s) (P/N 2) that align with the outer holes in the Tendon Bearing Plate (FIG. 2) to enable ATBAP attachment with Bolt or Stud assemblies (P/N 20 or 21), that also allow rigging the Tendon Tensioner Hydraulic Jack to the Tendon Bearing Plate for off-lifts, de-tensioning and re-tensioning Tendon sequences. The ATBAP is also constructed with Bearing Cap Hole(s) (P/N 3) that align with the End Cap attachment Holes in the Tendon Bearing Plate enabling studs or fasteners to be attached to fasten an End Cap over the Tendon Bearing Assembly.

The ATBAP shown has a HWHS (P/N 6) welded and/or bonded to the angled anchor plate portion that extends the angle to the concrete wall and functions as a hinge member when pivotally connected by Pivot Pin (P/N 9) to a perpendicularly flat OSSM Compression Strap (P/N 15). The Compression Strap fabricated with a pre-formed arc profile along its length is constructed with (2) HWPSs (P/N 7) at an end that aligns with the HWHS center hole to provide a movable attachment that allows CSAs to conform to and swing away from the wall for ease of installation and inspection (FIG. 1).

Figure 11:
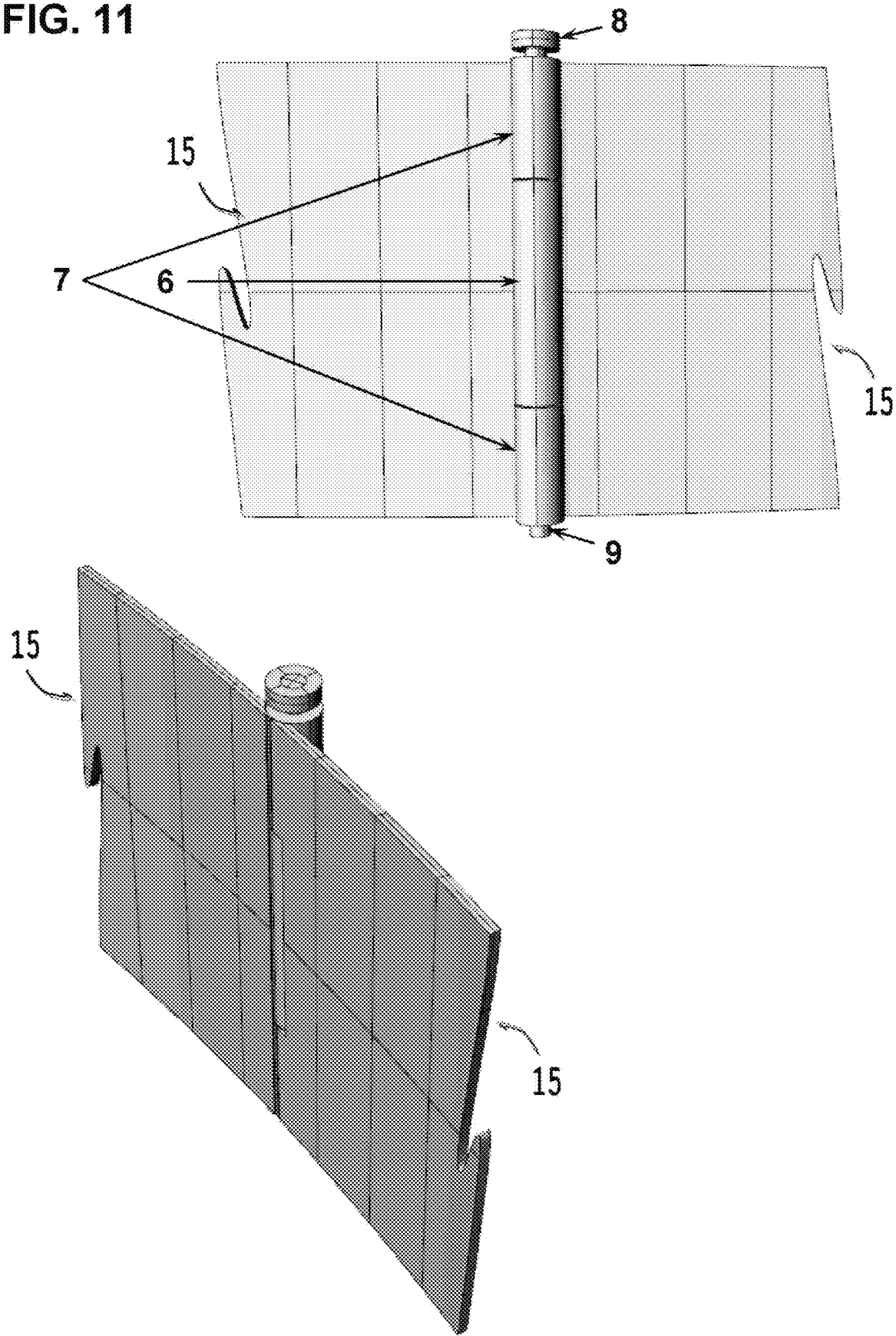

FIG. 11—presents front and back views of (2) OSSM perpendicularly flat OSSM Compression Straps (P/N 15) fabricated with a pre-formed arc that match the curvature of a concrete surface. One of the CSAs is constructed with an HWHS centered at its end that is flanked by (2) HWPSs at the outside end of the other CSA that are all attached to the Compression Straps by weld or bond. The CSAs are pivotally attached to each other by Hinge Pin (P/N 9) that allows the CSAs to conform to and swing away from a concrete wall for ease of installation and periodic inspections (FIG. 1).

Figure 12:
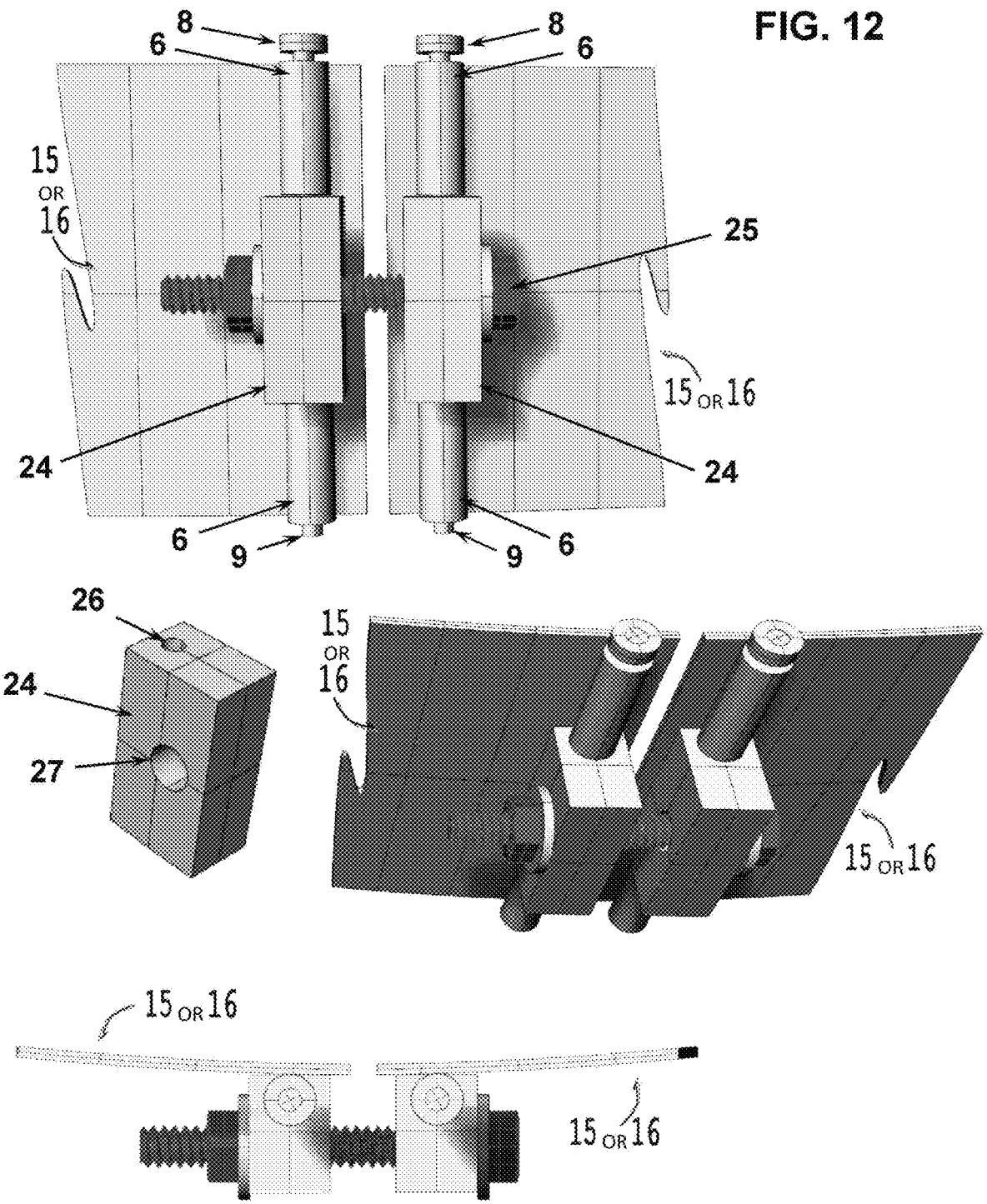

FIG. 12—presents front and top views of a CSA tensioning apparatus (P/Ns 6, 9, 24 and 25) constructed with a TPAB (P/N 24) that pivots between (2) HWHSs (P/N 6) on a Hinge Pin (P/N 9) at the tensioning end of each OSSM CSA (P/Ns 15 or 16). The apparatus enables a CSA to eliminate bending stresses on a Tensioning Shoulder Bolt Assembly (P/N 25), by self-aligning with a TPAB on an opposing OSSM CSA segment being tensioned. The tensioning apparatus provides one approach to apply a continuous compression force to strengthen the outer wall of Reactor Containment and Shield Building Structures (FIG. 1) or any concrete surface that may delaminate during an SSE such as Off-Gas, Smoke and Exhaust Stacks and structural supports.

Figure 13:
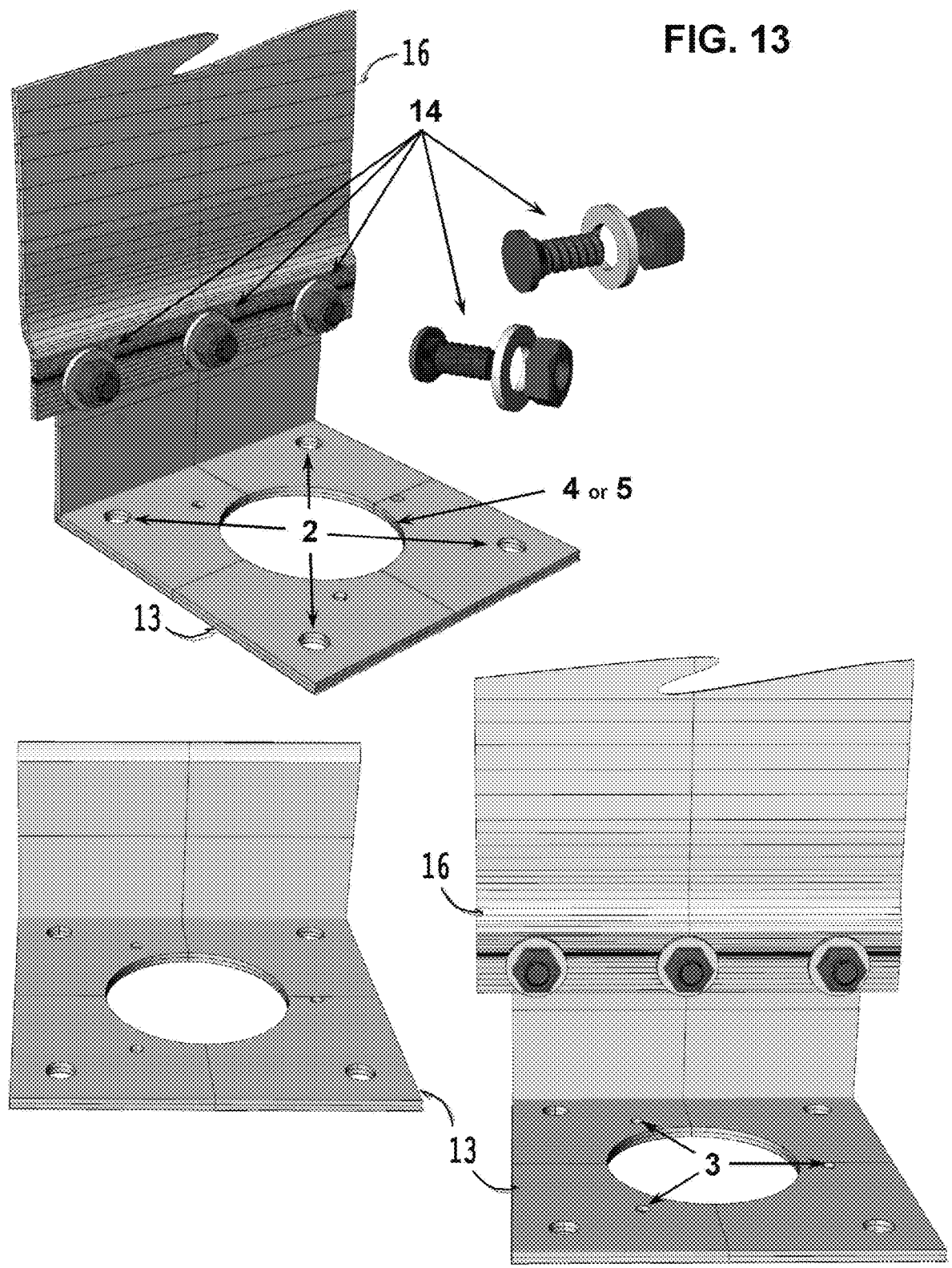

FIG. 13—presents an OSSM ATBAP (P/N 13) designed to anchor CSA Structural Strap Segments to the top of the Tendon Bearing Plate. The ATBAP is constructed with similar attributes as the ATBAP in FIG. 10 (P/Ns 2 thru 5), with exception that the Angled Anchor Plate can be constructed with Splined Stud Fastening Assemblies (P/N 14) to attach an offset CSA (P/N 16) to the ATBAP. The ATBAP is sized to enable the strap material to readily conform to and couple with the outer wall surface (FIG. 1). The Splined Stud Fastening Assemblies can be fastened by weld or bonding methods, or inserted from the back thru undersized holes that the splines bite into and prevent the Splined Stud from spinning, during tightening and torqueing sequences.

Figure 14:
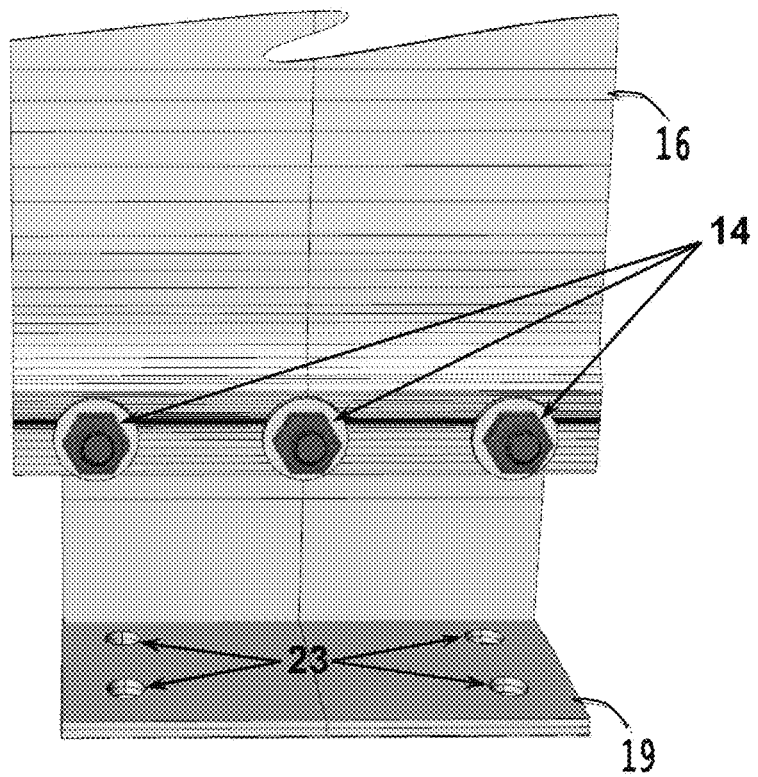
Figure 14:
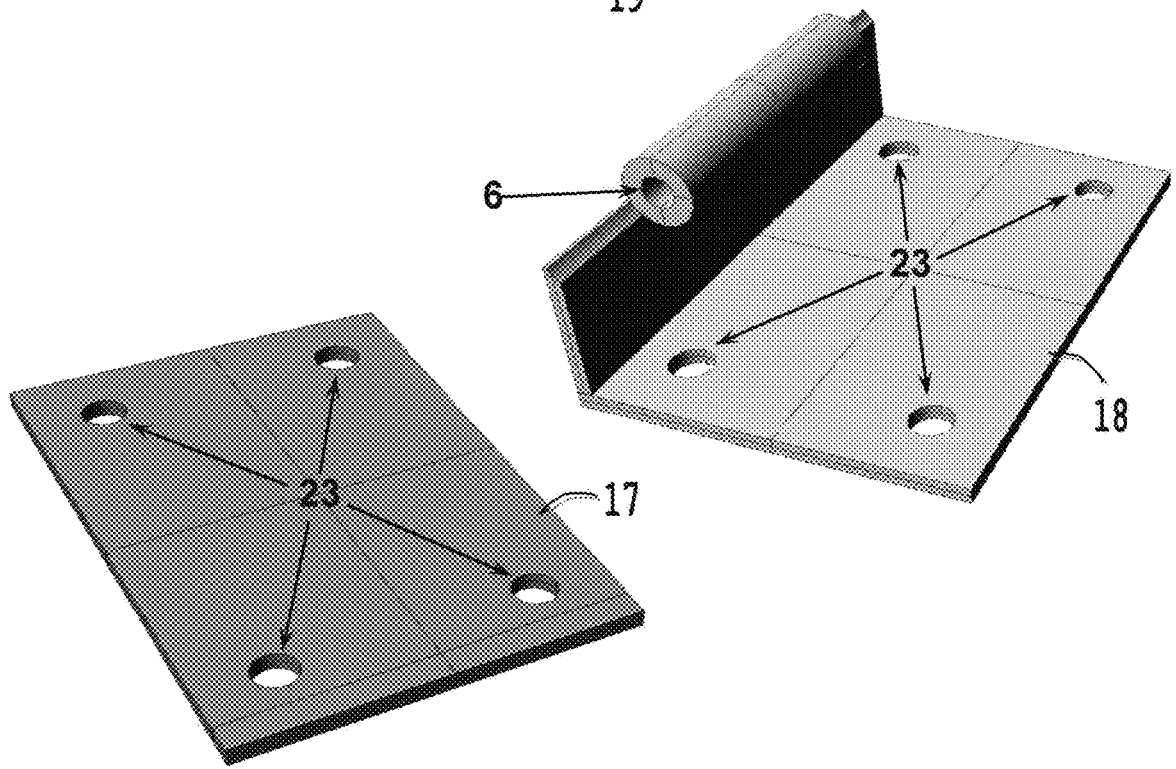

FIG. 14—presents OSSM Anchor Plate (P/N 17), Angled Anchor Plate (AAP) (P/N 18) and AAP (P/N 19) designed to anchor CSA Structural Strap Segments thru Anchor Hole(s) (P/N 23) to concrete extensions such as Equipment Hatches or Personnel Hatches that extend away from a concrete wall for anchoring various CSAs against a concrete wall. The Anchor Plates can also be attached by weld or bonding methods to steel surfaces.

Similar to Details 5, 7 thru 9, Flat Anchor Plate assemblies are constructed with a HWHS (P/N 6), a HSEB (P/N 11) or RHSB (P/N 12) attached by weld or bonding method to the Plate (P/N 17). This anchors and/or extends an HWHS to enable a CSA segment constructed with HWPSs (P/N 7) to be pivotally connected with Hinge Pin (P/N 9) and swung against a concrete wall to provide a wall strengthening compression force when tensioned.

Similar to FIG. 10, AAP assemblies are constructed with a HWHS (P/N 6) attached by weld or bonding methods to the Plate (P/N 18). This is to anchor and extend an HWHS to enable a CSA segment constructed with HWPSs (P/N 7) to be pivotally connected with Hinge Pin (P/N 9) and swung against a concrete wall to provide a wall strengthening compression force when tensioned.

Similar to FIG. 13, AAP assemblies are constructed with Splined Stud Fastening Assemblies (P/N 14) to attach an offset CSA (P/N 16) sized to enable the strap material to readily conform to and couple with the concrete wall surface.

Figure 17:
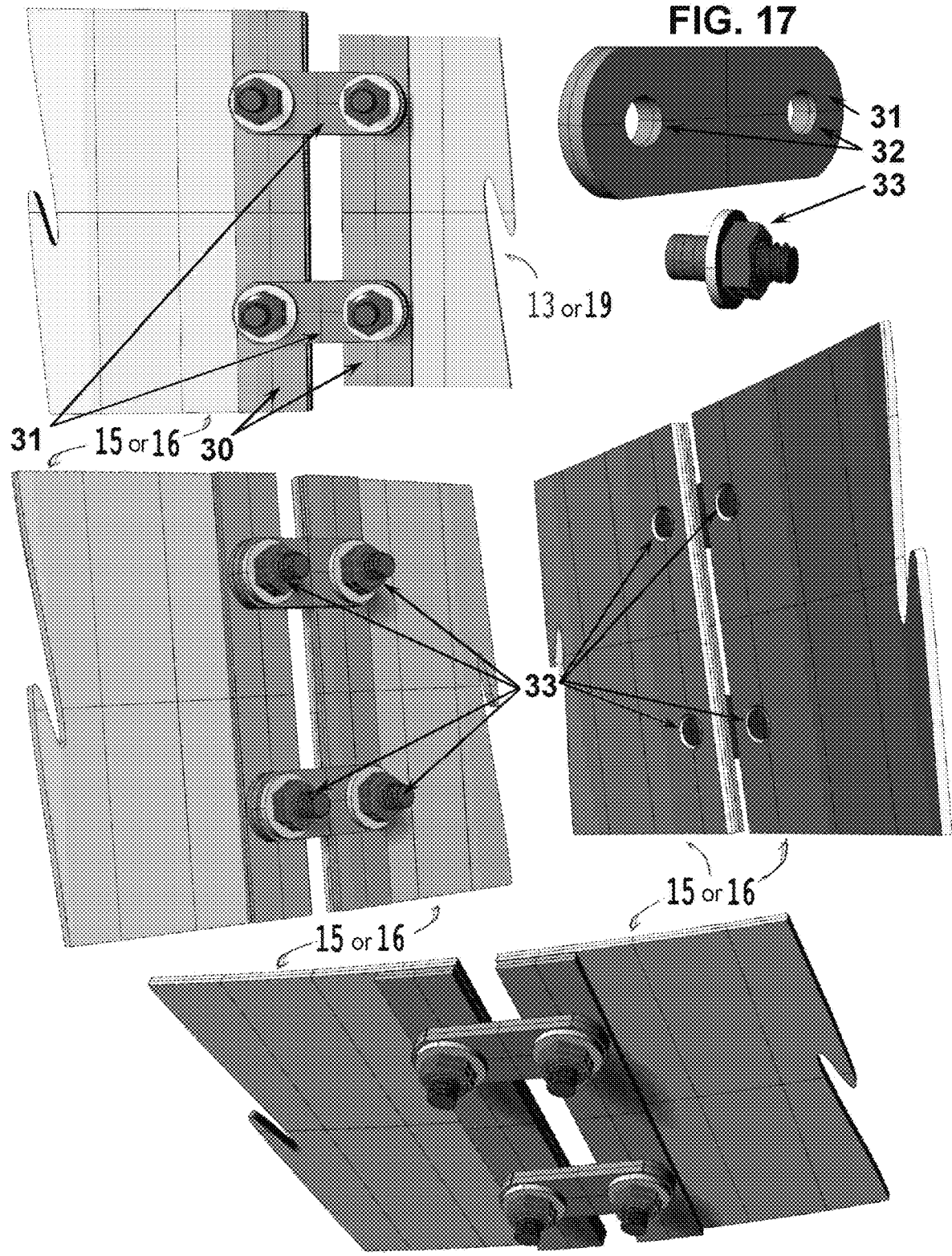

Similar to FIG. 17, AAP assemblies are constructed with a Self-Aligning Pivot Apparatus (P/Ns 30 thru 33) that enables OSSM Compression Strap segments to align with anchored AAPs when tensioned against a concrete wall (FIG. 1).

Figure 15:
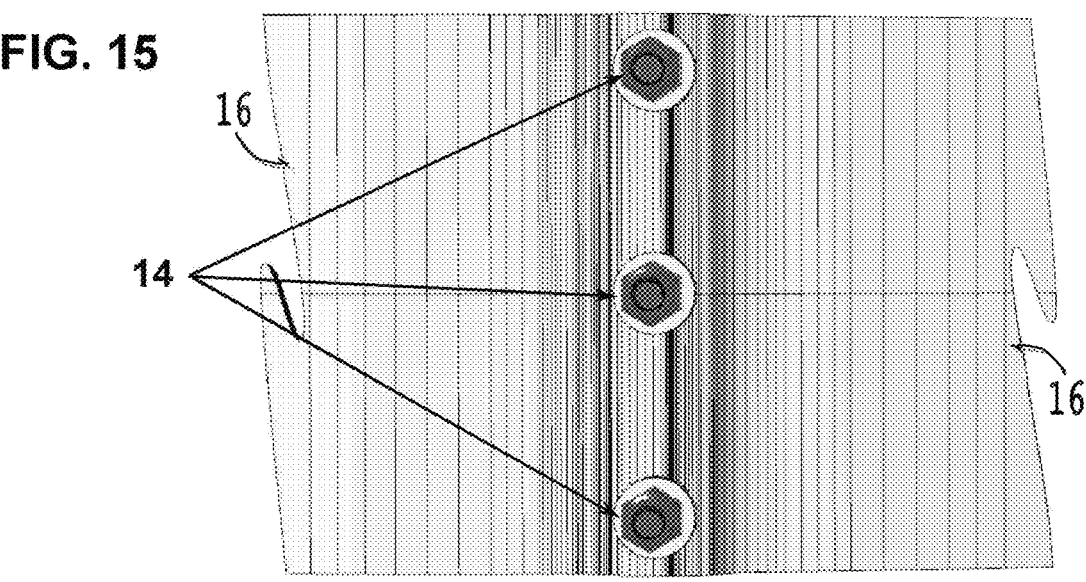
Figure 15:
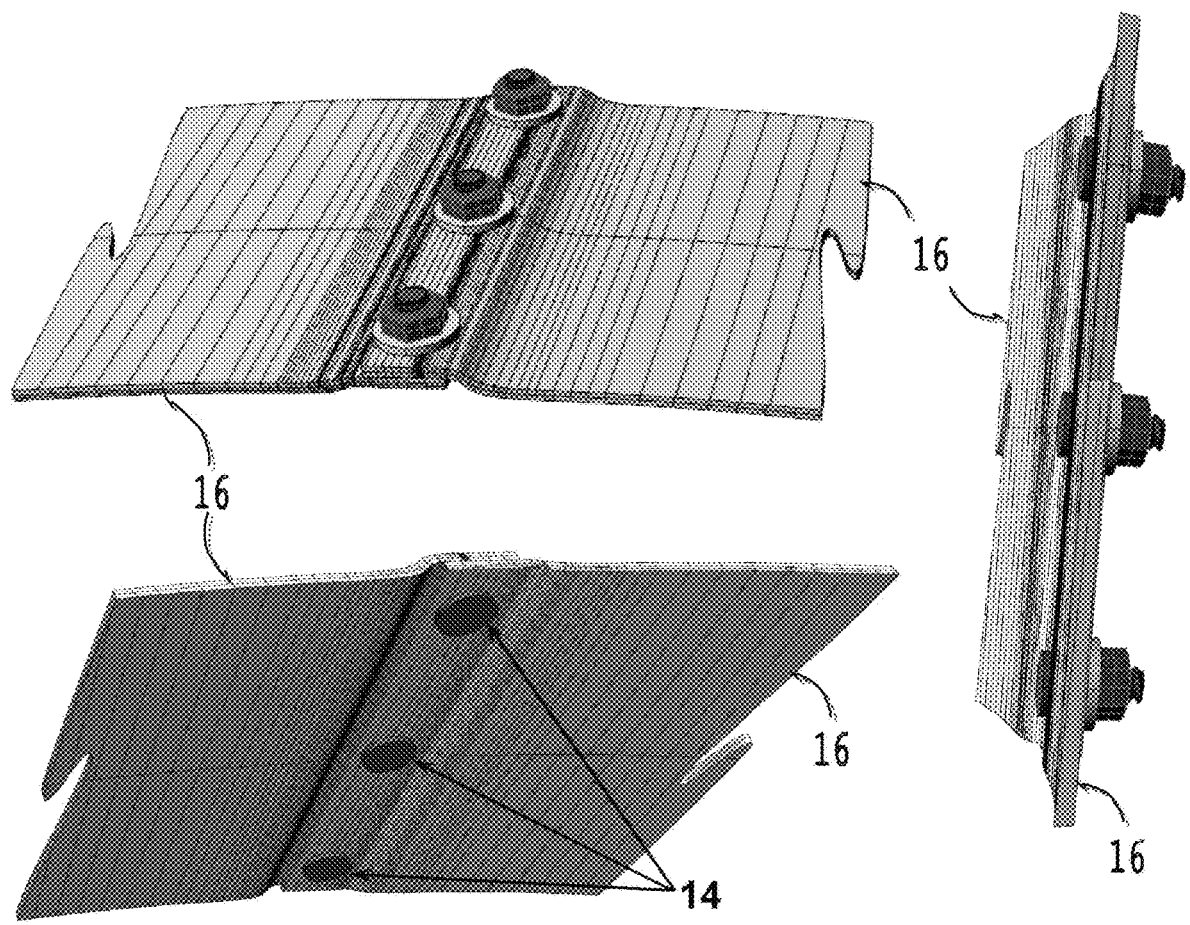

FIG. 15—presents front, top, bottom, and side views of OSSM Offset CSAs (P/N 16) attached to each other with Splined Stud Fastening Assemblies (P/N 14). The CSAs are fabricated with a pre-formed arc profile along their length that matches the curvature of a concrete surface (FIG. 1). The end of each Compression Strap is offset from one another and the perpendicularly flat back surface to allow the end(s) of Compression Strap segments to overlap each other and also fastened together with conventional fasteners such as rivets, flat head bolts washers and lock nuts.

Figure 16:
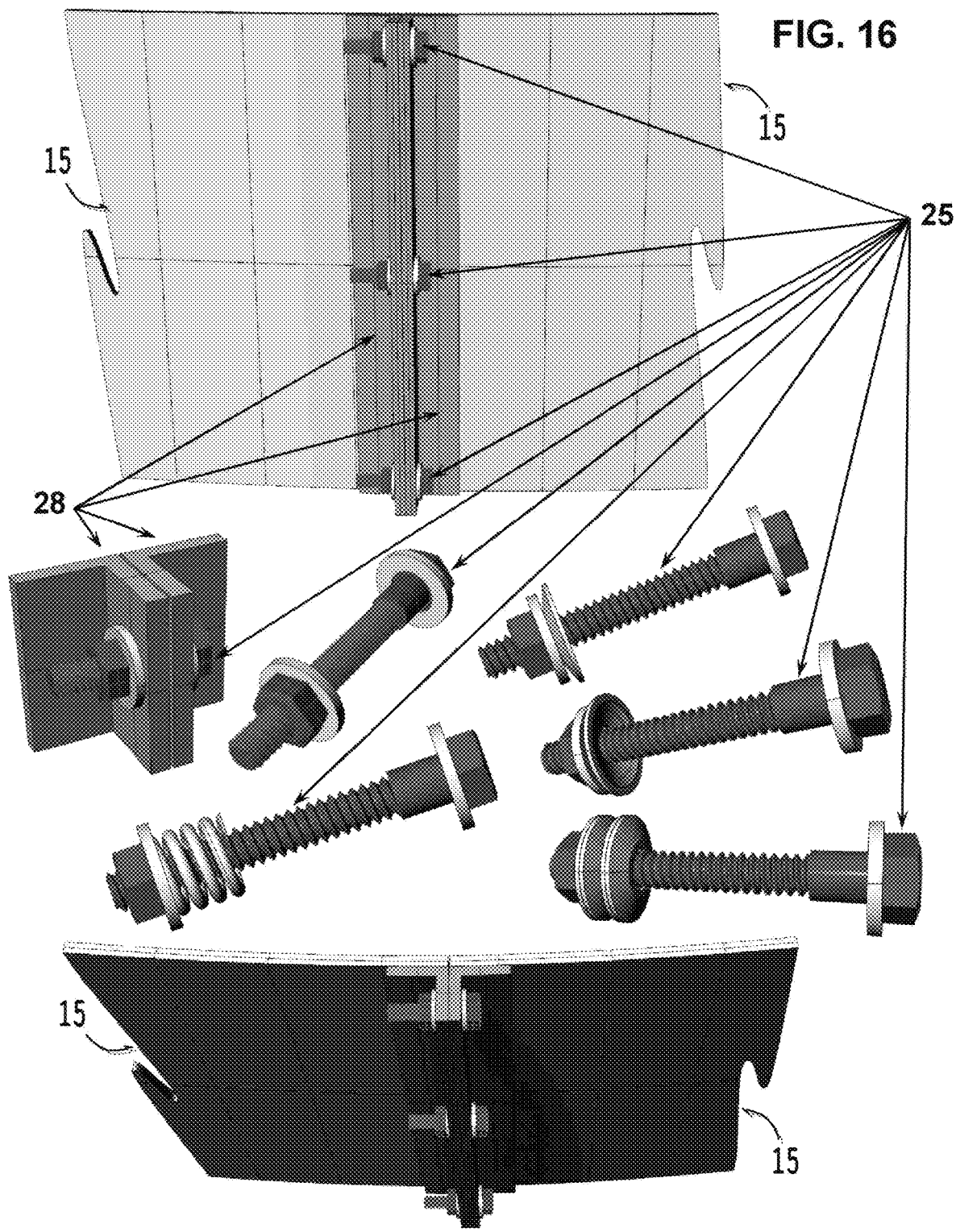

FIG. 16—presents front and top views of OSSM CSAs constructed with Angle Clams (P/N 28), fastened by weld or other bonding method, to perpendicularly flat Compression Strap (P/N 15) fastened to each other with Tensioning Shoulder Bolt Assembly (P/N25) for tensioning OSSM CSAs against a concrete surface (FIG. 1).

FIG. 17—presents a front view of OSSM CSA (P/N 15 or 16) with an end connected to either OSSM ATBAP (P/N 13) or AAP (P/N 19) with Self-Aligning Pivot Apparatus (P/Ns 30 thru 33) that enable CSAs to self-align with anchored Angled Tendon Bearing Anchor Plates (ATBAPs) or AAPs when tensioned against a concrete wall (FIG. 1). The CSA, ATBAP and AAP are constructed with Compression Strap Stiffener (P/N 30) that is fastened, bonded, welded or molded as an integral part to increase thickness and stiffness of the Strap or Angle Plate for insertion of a Shoulder Stud from (P/N 33). The SAPC (P/N 31) connects the Compression Strap and Angle Plate and pivots on the shoulder of the Shoulder Stud Fastening Assembly (P/N 33) that pivotally fastens the apparatus together.

FIG. 17 also presents front, top and back views of OSSM CSAs (P/Ns 15 and or 16) that may be interconnected to each other, at an appropriately configured end, with Self-Aligning Pivot Apparatus (P/Ns 30 thru 33).

Figure 18:
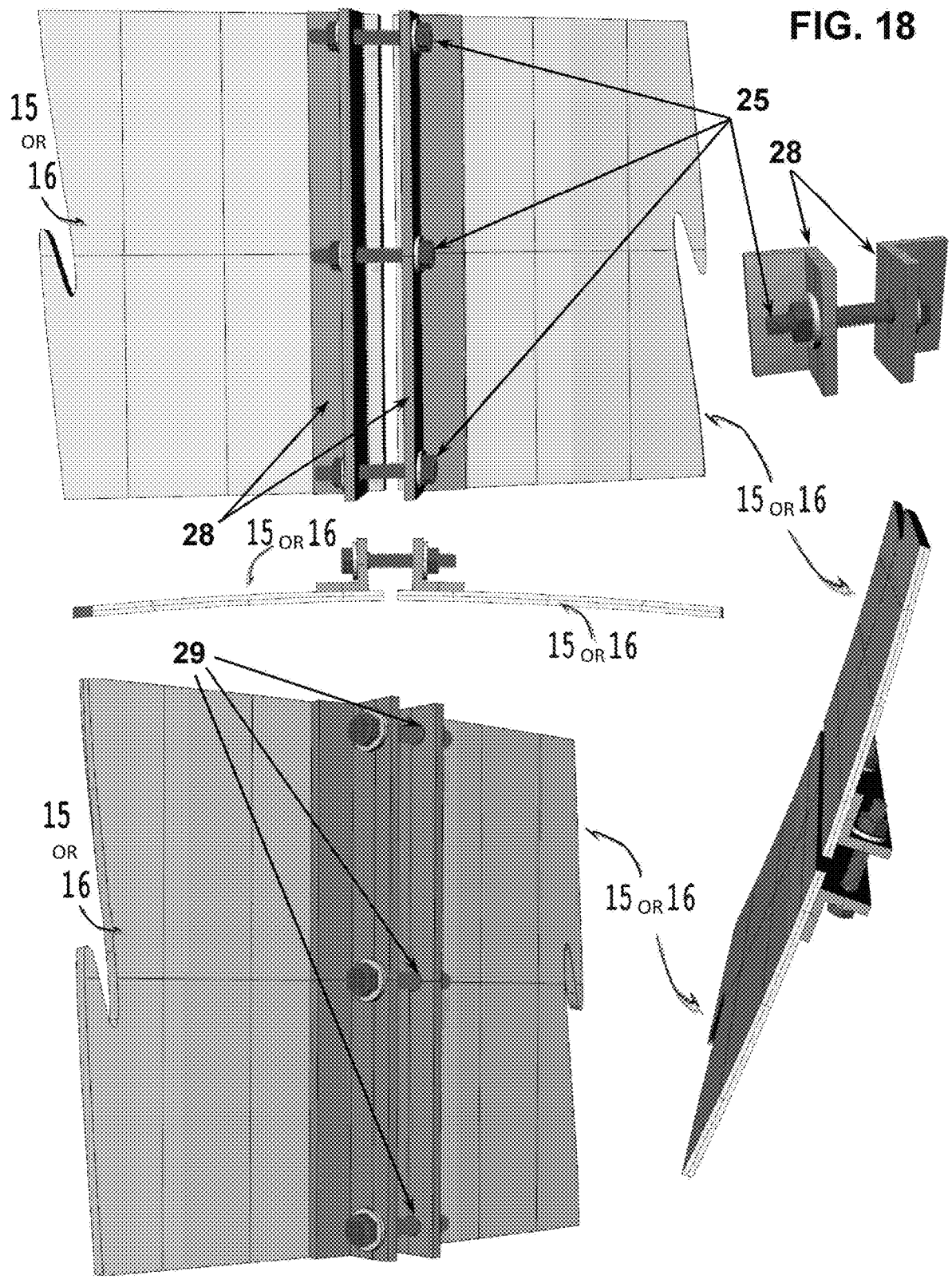

FIG. 18—presents front, side, bottom, top and back views of OSSM CSAs (P/N 15 and or 16) fabricated with preformed arc profile that matches the curvature of a concrete surface. Angle Clams (P/N 28) can be fastened, welded or bonded or molded to perpendicularly flat Compression Strap (P/N 15) or Off-Set Compression Strap (P/N 16). The Clams are fastened to each other with Tensioning Shoulder Bolt Assembly (P/N 25) for aligning and tensioning OSSM CSA segments against a concrete surface (FIG. 1).

Figure 19:
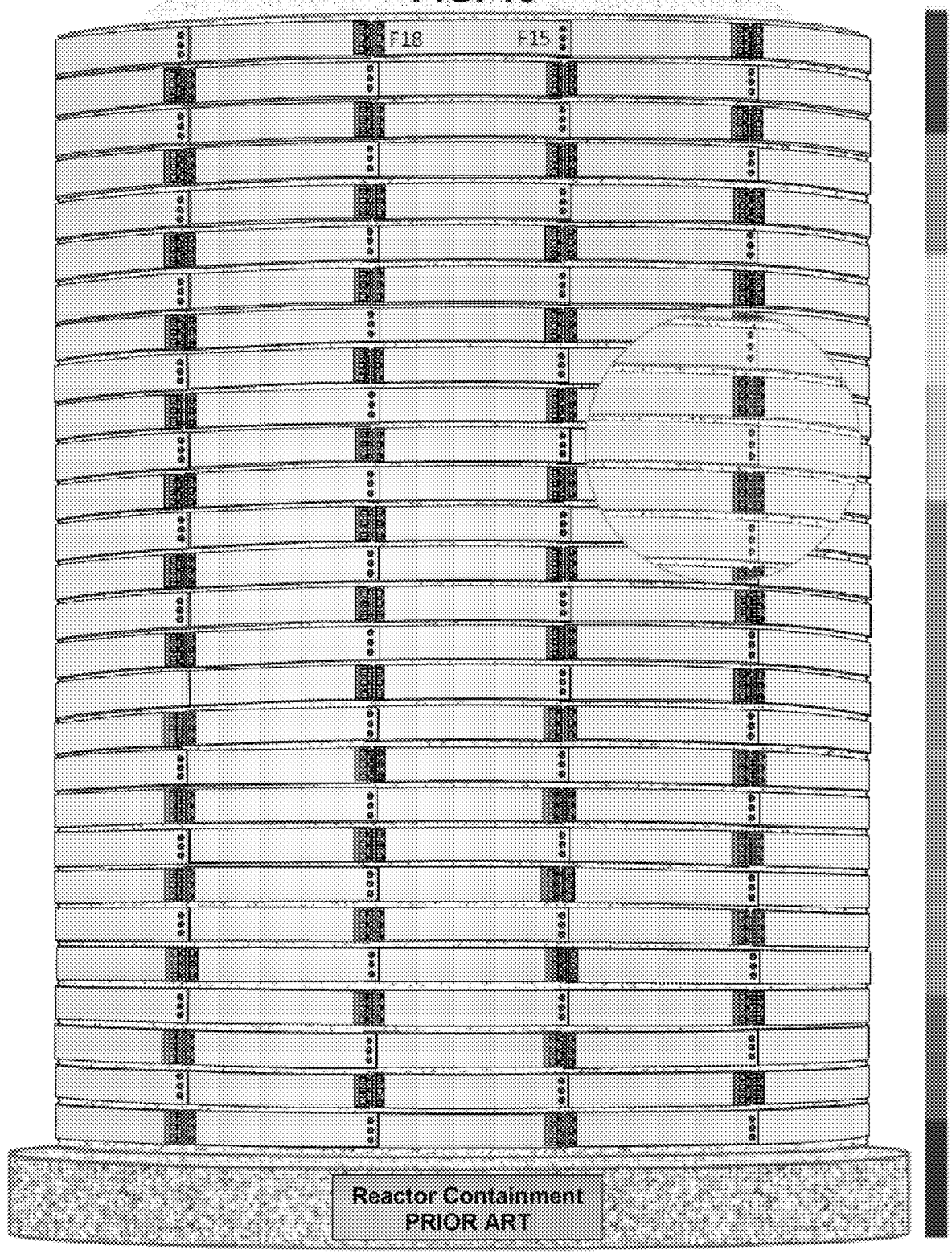

FIG. 19—represents a Reactor Containment Outer Structural Shell without external Buttresses fitted with an example of OSSMs that reduce material thickness in relation to elevation and analyzed SSE accelerated mass decrease, if desired by the end user.

Figure 20:
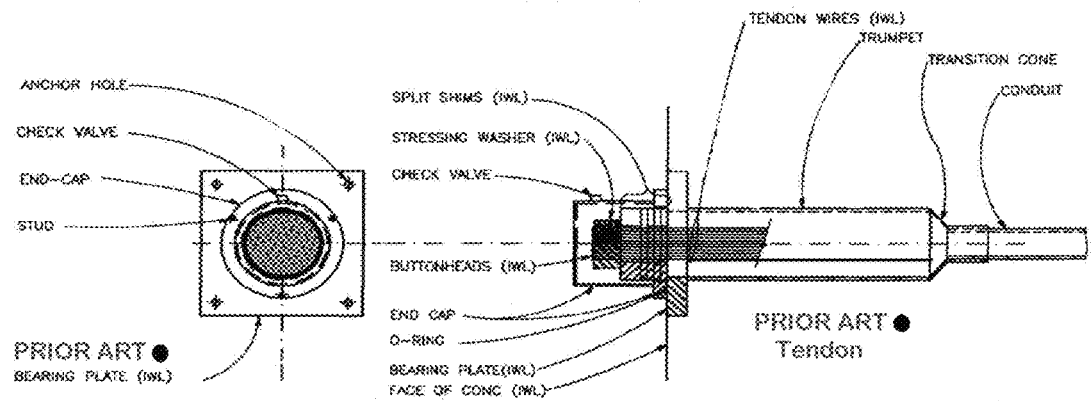

FIG. 20—illustrates an example of how Prior Art Horizontal/Hoop Tendons that OSSMs attach in FIG. 1, traverse through the protruding vertical buttresses and concrete walls to apply tensioned circumferential compression force to the inner Containment wall structure.

DETAILED DESCRIPTION OF THE PREFERRED EMBODIMENTS

Presenting innovative Structural Shell Members (FIGS. 1-18) designed to apply a supportive compression force to the outer concrete wall of a Reactor Containment or Shield Building Structure, or any curved concrete surface such as Off-Gas, Smoke and Exhaust Stacks or supporting structural surface that may crack or delaminate from adverse structural loading. Cracks within a concrete structure may cause concrete to delaminate and contribute to the total mass energy transferred to the outer radius of the structure during a SSE. The Structural Members create an Outer Structural Shell that becomes an integral means to counter and withstand the effects of the maximum postulated SSE that may also cause concrete cracks to occur outside-of or beyond the compression provided by the horizontal and vertical wall tendons or outside of other inner reinforced concrete in a Reactor Containment wall. The Outer Structural Shell design also counters the effects of the worst-case DBA.

Seismic acceleration of a structure increases with elevation therefore the maximum seismic load will occur at higher elevations of the structure during an earthquake.

Cracked concrete and loss of concrete adhesion from thermal forces, alkali-silica reaction (ASR), alkali-aggregate reaction (ACR), corrosion of embedded metals that decouple or delaminate concrete from the substrate outside of an inner compressed concrete mass, can degrade the shielding capabilities of a Containment Structure. It can also challenge 10 CFR 50 Appendix J limits for Primary Containment Leakage or potentially damage safe shutdown components from spalling impacts if allowed to dislodge from the structure. The new Outer Structural Shell strengthens a Reactor Containment or Shield Building against concrete cracks and delamination of the structure by applying a supportive compression force to the outer surface of the structure. Compressing the outer wall surface potentially closes existing cracks, it opposes and contains accelerated mass energy from low adhesion and or delaminated concrete that may propagate to the outer concrete surface during a SSE or DBA, to preserve and improve shielding and structural integrity of the Reactor Containment Structure. By increasing the overall compressed concrete mass, it can also improve structural integrity for 10 CFR 50.150 aircraft impact assessments (AIAs).

1. Outer Structural Shell Members (OSSMs) also create a protective Outer Structural Shell that applies a continuous compression force to the outside concrete surface of Reactor Containment Structures challenged by various obstructions that attach to and/or penetrate thru the outer wall. The invention also introduces several innovative non-obtrusive relatively easy to handle OSSM designs that enable several methods for attaching, connecting, interconnecting and anchoring OSSMs in various configurations.

FIG. 1 illustrates various OSSM configurations, represented by numbered Figures XX, as examples of how OSSMs can readily be installed or removed to accommodate Plant Modifications or Plant Inspections.

2. Reactor Containment OSSMs comprise non-obtrusive Anchor Plates and Straps designed to be attached, connected and interconnected in various segmented combinations. This allows installation between, around or even behind obstacles (such as supports, hangers, pipes, beams, conduits etc.) that abut, attach or traverse through the outer Containment Structure, and/or conform to the outer concrete wall surface. OSSMs enable a very cost effective, safe and relatively easy installation in whatever combination deemed best to address an obstacle challenge. In confined spaces, it may be necessary to use shorter OSSM segments to maneuver in and around obstacles. The inter-connective design of the OSSMs enables them to be adapted to their surroundings for ease of installation and removal to accommodate future Plant Mods and Inspections. Some of the methods for interconnecting the OSSM Segments enable them to self-align and/or swing away from each other to better conform to the outer concrete wall surface and ease assembly.

Because the seismic acceleration of a Reactor Containment Structure increases with elevation, the maximum seismic loads will also occur near the top of the structure during a SSE.

Therefore, as the location of the OSSM Straps decrease in elevation the seismic acceleration and loading on the Straps, also decreases. A decrease in the seismic load also reduces the OSSM Strap and Anchor Plate material thickness and/or stiffener requirements. OSSM Strap and Anchor Plate material weight and/or requirement for stiffeners decrease with elevation. This phenomenon has a natural tendency to work coincidentally in favor of the design of the OSSMs because it enables the majority of materials to be constructed with lighter materials if desired, which in turn makes them less costly and less obtrusive for installation in and around the majority of obstacles that are located at lower elevations of Structures.

3. OSSMs should be constructed from materials that exhibit similar thermal expansion and contraction characteristics as concrete, materials that demonstrate exceptional stiffness over their distributed mass to achieve superior material yield strength, to resist axial, tensile, compression and traverse loading, resist stretch or elongation, strain or shear forces, resist deformations and embrittlement. OSSMs may also be coated to resist other degradations from exposure to atmospheric elements such as infrared and ultra violet light, salt mist, oxidization, cyclic changes in temperature and humidity, ozone, and radiation. OSSMs constructed from lighter materials will also contribute less to overall accelerated mass.

4. OSSMs can readily be constructed with wells and brackets that will accommodate installation of strain gauges and load cells to measure loads on the OSSMs and the compression force they apply to the Reactor Containment Structure. Strain gauges and load cells can also be used to detect and/or measure changes in creep strain and any creep force losses from elongations or compression of certain materials that may result in tensioning slack that reduces compression force.

5. FIG. 1 illustrates several examples of how OSSMs can traverse between perpendicular Buttresses that are evenly distributed around the Reactor Containment. The Buttresses are a significant structural component of the Reactor Containment Structure that extend away from the concrete wall surface and anchor tensioned Horizontal/Hoop Tendons in the Containment wall. The Buttresses have highly reinforced sections that anchor the Reactor Building Horizontal/Hoop Tendons on Tendon Bearing Plates and house the Tendon Trumpets, Transition Cones and Conduits. FIG. 20 shows some Horizontal/Hoop Tendons that connect Buttresses.

6. OSSMs that are fabricated into thin strap materials in various length segments provide a wide flat surface that couples with the covering the Reactor Containment outer wall traversing between Buttresses. There are various designs of the OSSMs that enable them to be both non-obtrusive for installation around obstacles and provide a supportive compression force against the outer wall strengthening the outer Reactor Containment Structure between the Buttresses from the effects of an earthquake.

7. OSSM Straps and Anchor Plates provide various methods for attachment that in certain cases also allow for angle and tensioning adjustment and enable them to self-align to conform with and exert a supportive circumferential compression force to the outer wall of the Reactor Containment or Shield Building Structures.

8. Some OSSM Anchor Plates (FIGS. 3-10, 13), are designed to anchor to the horizontal Tendon Bearing Plates at each Buttress Horizontal/Hoop Tendon and anchor each end of the OSSM Straps (FIGS. 5-18) that traverse between the Buttresses. The Horizontal/Hoop Tendons traverse between (2) wall sections before they anchor to a Buttress Bearing Plate. Tendon Bearing Plates facing each other on a given RB wall section (approximately 69 feet wide in the example of FIG. 1), are not attached to the same Horizontal/Hoop Tendon assembly traversing within the wall section being compressed by the OSSM anchored to the Tendon Bearing Plates. The application and benefit of this configuration allows transference and dissipation of the tensioned and potential SSE or DBA loads, to be distributed over (2) adjoining wall sectors in either direction extending from the other side of the Buttresses, through the Horizontal/Hoop Tendons connected to the tensioned OSSM Straps that compress a given wall section. Therefore, the loading of each OSSM Strap on a given Horizontal/Hoop Tendon is negligible, because it does not transfer its load to the same Horizontal/Hoop Tendon that is compressing the RB wall section compressed by the OSSM Strap. This transference and dissipation of OSSM Strap loading significantly strengthens the overall Reactor Containment Structure. Tying the outer Reactor Containment Structure together with the OSSM Strap design to apply continuous compression force to the outer concrete wall(s) also improves the structural rigidity of the Buttresses to withstand the maximum postulated SSE.

9. For Reactor Containment and Shield Building Structures that do not have Buttresses that extend away from the wall, the OSSM Strap segments (FIGS. 11, 12, & 15 thru 18) simply attach to each other around the outer surface of the structure and apply a supportive compression force to the outer wall(s). The Outer Structural Shell will counteract further degradation from internal or external concrete cracking that may cause the concrete to delaminate from the main structure. The non-obtrusive OSSM Straps strengthen the overall structure to counter accelerated seismic loads from the maximum postulated SSE and withstand the effects of the maximum postulated DBA to maintain Primary Containment leakage within 10 CFR 50 Appendix J criteria.

10. OSSM Anchor Plates (FIGS. 3-10) have through holes (2) that enable rigging a Hydraulic Jack Tendon Tensioner to the Tendon Bearing Plate for off-lifts, de-tensioning and re-tensioning Tendon sequences, and (3) enable fastening the Tendon End Cap to the Tendon Bearing Plate. Anchor Plates also have a large center hole that is either sized to fit around the outside of Tendon Split Shims or is sized smaller to fit around the Tendon Anchor Head Stressing Washer enabling it to be anchored to the Tendon Bearing Plates in the following ways:

a). For OSSM Anchor Plates that have thru holes (2) sized the same as the Bearing Plate with a center hole (5) sized to fit over the Tendon Anchor Head Split Shims, the Anchor Plate can be fastened with Bolts (20) or Studs (21) that are screwed into threaded holes in the 3" Tendon Bearing Plate, without having to de-tension or re-tension the Tendon.

b). For OSSM Anchor Plates sized the same as the Bearing Plate with a center hole (4) that is sized to fit the Tendon Anchor Head Stressing Washer, the Anchor Plate fits beneath and becomes part of the Tendon Shim. Additional Split Shims are simply added to the top of the Anchor Plate and Bearing Plate to complete the desired tension. The Anchor Plate remains fastened by the tensioned Tendon assembly and becomes an integral part of the Bearing Plate. If desired, the Anchor Plate may also be fastened with (4) Bolts (20) or Studs (21) to the Bearing Plate that may also be used to mount the Hydraulic Tensioner Jack.

c). For OSSM Anchor Plates (FIG. 6) sized wider than the Bearing Plate, the Anchor Plate can be Anchored to the Bearing Plate with Bolts (20) or Studs (21), and also anchored by concrete anchors installed through Anchor Plate holes (22) on either side of the Bearing Plate, and/or fastened to each other by an overlay plate with the same hole (22) pattern if desired.

d). In addition to utilizing Bolts and Studs to fasten OSSM Anchor Plates to the Tendon Bearing Plates they may also be bonded to the Bearing Plates if so desired. Bonding provides excellent sealing and non-obtrusive fastening and attachment characteristics. Certain bonding methods may be reversed by induction heating to remove the Anchor Plate if so desired.

11. OSSM Anchor Plates and Straps accommodate a versatile installation. They may be fastened together in various ways (as illustrated by a few examples in FIG. 1) depending upon the application of utility and preferences of the users. Each method provides advantages to accommodate different conditions encountered in the field. The designs of the OSSM Straps and Anchor Plates are not limited to the examples provided in the figures. They are merely provided as a reference point to communicate to engineering the concepts of how the OSSMs create a functional Outer Structural Shell for a Reactor Containment or Shield Building Structure, or any curved concrete surface on other structures such as Off-Gas, Smoke and Exhaust Stacks or support structures such as pier columns and pillars. It is anticipated that the user will first assess the complexity of obstacles in the vicinity of installation, and determine the length, width, the number of segments required to cover an expanse, and decide a preferred method of attachment. When a decision is made on the selection of preferred embodiments, the OSSMs are fabricated to the desired dimensions and design(s) and installed in the most practical way usually starting from the bottom of the structure and working to the top. For Containment or Shield Building Structures with protruding Buttresses that anchor Horizontal/Hoop Tendons as illustrated in FIG. 1 the preferred method for installation is to install the Anchor Plates for both sides of a span to the Tendon Bearing Plates first. The individual Compression Strap segments are then connected and or attached to the Anchor Plates and to each other followed by final alignment and pre-tensioning with the desired Tensioning Assembly. Once a span between the Buttresses is installed and pre-tensioned the next span can be used to support the OSSMs during installation of the next span of the Outer Structural Shell prior to final tensioning. For structures without protruding Buttresses, Compression Strap segments are temporarily supported, aligned and pre-tensioned, before the final tensioning sequence of the overall structure.

DESCRIPTION OF EMBODIMENTS

Part No. 1—in FIGS. 3-5 and 7-9 is an OSSM Tendon Bearing Anchor Plate (TBAP) with Hole(s) (P/N 2) sized to enable it to be fastened directly to a Tendon Bearing Plate with Bolt or Stud assemblies (P/N 20 or 21). The TBAP if so desired may be bonded as a means for being fastened directly to a Tendon Bearing Plate. The TBAP can be constructed with a Stressing Washer Center Hole (P/N 4) sized to the outside circumference of a Tendon Stressing Washer enabling it to become a shim that also reduces the number of Split Shims required to tension a Tendon Assembly. Once Tensioned the Tendon Assembly also fastens the TBAP to the Tendon Bearing Plate by compression of the Split Shims. The TBAP can also be constructed with a Split Shim Center Hole (P/N 5) that fits around the outer circumference of the Tendon Split Shims. The TPAB is also constructed with End Cap Holes (P/N 3) that either traverse through, and align with holes in the Tendon Bearing Plate or enable studs to be attached that allow an End Cap that seals the Tendon Assembly from outside elements to be fastened. The TBAP can be elongated to extend to the wall. The TBAP can also be constructed to attach various Compression Strap Assemblies (CSAs) to the Horizontal/Hoop Tendon Bearing Plates (FIG. 1).

Part No. 2—in FIGS. 3, 4, 10, and 14 is a Tendon Bearing Plate Hole that aligns with the outer holes in the Tendon Bearing Plate (FIG. 2) to enable TBAP attachment with Bolt or Stud assemblies (P/N 20 or 21), and rigging the Tendon Tensioner Hydraulic Jack to the Tendon Bearing Plate for off-lifts, de-tensioning and re-tensioning Tendon sequences.

Part No. 3—in FIGS. 3-10 and 13 is a Bearing Cap Hole that aligns with the End Cap attachment Holes in the Tendon Bearing Plate (FIG. 2) that enable studs or fasteners to be attached to fasten an End Cap over the Tendon Bearing Assembly.

Part No. 4—in FIGS. 3, 9, 10 and 13 is a Stressing Washer Center Hole that is sized to fit the outside circumference of a Tendon Stressing Washer. It enables a TBAP to become a shim that also reduces the number of Split Shims required to tension a Tendon Assembly, and at the same time become anchored to the Tendon Bearing Plate when the Horizontal/Hoop Tendon is re-tensioned.

Part No. 5—in FIGS. 3-8, 10 and 13 is a Split Shims Center Hole that is sized to fit the outside circumference of the Tendon Split Shims. This enables a TBAP to be easily attached and removed from a Tendon Bearing Plate without de-tensioning or re-tensioning the Horizontal/Hoop Tendon.

Part No. 6—in FIGS. 5-12 and 14 is a Heavy Wall Hinge Support (HWHS) that is attached by weld or bond to various configurations of the TBAP and Anchor Plates (FIG. 1). It is also used for supporting the Tensioning Pivot Alignment Block (TVAB) (P/N 24) used for tensioning various CSAs. The HWHS has a center hole that traverses through its center that aligns with the center hole in Heavy Wall Pivot Support (P/N 7) it also aligns with the Hinge Pin Hole (P/N 26) in the Tensioning Pivot Alignment Block. The HWHS and Heavy Wall Pivot Support are rotationally attached by a Hinge Pin (P/N 9). The HWHS is an integral part of an apparatus that provides a movable attachment and allows CSAs to conform to and swing away from a concrete wall for ease of installation and periodic inspections. It also functions as an integral part of a CSA tensioning apparatus.

Part No. 7—in FIGS. 5-11 is a Heavy Wall Pivot Support (HWPS) that is attached by weld or bond to various configurations of CSAs (FIG. 1). The HWPS has a center hole that traverses through its center and aligns with the center hole, in a HWHS (P/N 6) attached to configurations of the TBAPs and other Anchor Plates. A Hinge Pin (P/N 9) rotationally attaches a HWPS and HWHS. The HWPS is an integral part of an apparatus that provides a movable attachment that allows CSAs to conform to and swing away from a concrete wall for ease of installation and periodic inspections.

Part No. 8—in FIGS. 5-12 is a Hinge Pin Cap. The Cap is attached to Hinge Pin (P/N 9). The purpose of the Cap is to assure the Hinge Pin does not fall out of the center hole in the HWPM, HWHM and CSA tensioning apparatus. Depending upon user preference, the Cap can be threaded to screw on a Hinge Pin. It can also be permanently attached by weld or bond, or machined into the Hinge Pin. It may also take the form of a clip such as a Split Ring Clip that fastens to a groove or traverses through a hole in the end of a Hinge Pin for ease of installation or removal.

Part No. 9—in FIGS. 5-12 is a Hinge Pin that traverses through the center hole in the NWPM and HWHM and or traverses through a hole (P/N 26) in a Tensioning Pivot Alignment Block. The Hinge Pin is an integral part of an apparatus that provides a movable attachment that allows CSAs to conform to and swing away from a concrete wall for ease of installation and periodic inspections.

Part No. 10—in FIG. 6 is an OSSM Wide Tendon Bearing Anchor Plate (WTBAP). Similar to the TBAP a WTBAP is constructed with Tendon Bearing Plate Hole(s) that align with the outer holes in the Tendon Bearing Plate sized to enable it to mount directly to a Tendon Bearing Plate with Bolt or Stud assemblies (P/N 20 or 21). The WTBAP can also be constructed with a Stressing Washer Center Hole (P/N 4) sized to the outside circumference of a Tendon Stressing Washer enabling it to become a shim that also reduces the number of Split Shims required to tension a Tendon Assembly. Once Tensioned the Tendon Assembly will also fasten the WTBAP to the Tendon Bearing Plate. The WTBAP shown is constructed with a Split Shim Center Hole (P/N 5) that fits around the outer circumference of the Tendon Split Shims. In addition, the WTBAP is constructed with Anchor Holes (P/N 22) that enable it to be anchored alongside the Tendon Bearing Plate if additional or alternate fastening is desired in place of attachment to the Tendon Bearing Plate. The Anchor Holes (22) also enable fastening multiple WTBAPS together using an overlay plate with the same hole (22) pattern if desired. The WTPAB is also constructed with End Cap Holes (P/N 3) that either traverse through, and align with holes in the Tendon Bearing Plate or enable studs to be attached that allow an End Cap that seals the Tendon Assembly from outside elements to be fastened to the WTABAP. The WTBAP can be elongated to extend to the concrete wall. The WTBAP can also be constructed to attach various CSAs to the Horizontal/Hoop Tendon Bearing Plates.

Part No. 11—in FIG. 7 is a Hinge Support Extension Block (HSEB) attached by weld or bond to the TBAP. Rather than elongating the TBAP to the outer concrete wall of the Reactor Containment Structure, the HSEB extends an HWHS to enable a CSA to swing against the outer wall and provide a supporting compression force.

Part No. 12—in FIGS. 8 and 9 is a Raised Hinge Support Block (RHSB) attached by weld or bond to the TBAP. The RHSB raises the HWHS above the top surface of the TBAP to enable clearance for installing Bolt or Stud assemblies (P/N 20 or 21) to attach the TBAP to the Tendon Bearing Plate and support the Tendon Tensioner Hydraulic Jack. Raising the HWHS also offsets Hinge Pin locations (FIG. 1) and assists installation and removal of Hinge Pins.

Part No. 13—in FIGS. 10, 13 and 17 is an OSSM Angled Tendon Bearing Anchor Plate (ATBAP). Similar to the TBAP an ATBAP is sized to enable it to mount directly to a Tendon Bearing Plate (FIG. 1) with Bolt or Stud assemblies (P/N 20 or 21). The ATBAP can be constructed with a Stressing Washer Center Hole (P/N 4) sized to the outside circumference of a Tendon Stressing Washer (FIG. 2) enabling it to become a shim that also reduces the number of Split Shims required to tension a Tendon Assembly. Once Tensioned the Tendon Assembly will also fasten the ATBAP to the Tendon Bearing Plate. The ATBAP can be constructed with a Split Shim Center Hole (P/N 5) that fits around the outer circumference of the Tendon Split Shims. The ATPAB is also constructed with End Cap Holes (P/N 3) that either traverse through, and align with holes in the Tendon Bearing Plate or enable studs to be attached that allow an End Cap that seals the Tendon Assembly from outside elements to be fastened to the ATBAP. The ATBAP can be elongated to extend to the concrete wall. The ATBAP can also be constructed to anchor various CSAs to the Horizontal/Hoop Tendon Bearing Plates. It can be constructed with apparatus shown in (FIG. 10) to enable CSAs to swing away from a concrete wall. It can also be constructed with Splined Stud fastening assemblies (FIG. 13 P/N 14) or Angle Clamp tensioning apparatus (FIG. 16 P/Ns 25 and 28) or Self Aligning Pivot apparatus (FIG. 17 P/Ns 30 thru 33).

Part No. 14—in FIGS. 13-14 is a Splined Stud Fastening Assembly used to interconnect CSAs to each other and attach an offset CSA to the ATBAP. The Splines on the stud inserted into undersized holes in the CSA and ATBAP, prevent the stud from turning and falling out during assembly, tightening and torqueing sequences.

Part No. 15—in FIGS. 5-12 and 16-18 is a perpendicularly flat OSSM Compression Strap fabricated with a preformed arc profile along its length that matches the curvature of a concrete surface. The Compression Strap may also be pre-formed to mate with uneven surfaces that have projections such as ridges, ledges and bulges, or depressions such as groves or impressions. This enables the strap material to readily conform to and couple with the outer concrete surface in order to apply a strengthening compression force.

OSSM Straps consist of thin non-obtrusive strap materials in various width and length segments to provide a continuous wide flat surface for wall coverage. As CSAs, they are designed to be interconnected in various segmented combinations and also connected to various anchor plates. CSAs are also designed to self-align and conform to the outer wall of Reactor Containment and Shield Building Structures (FIG. 1), or any concrete surface that may delaminate during an SSE such as Off-Gas, Smoke and Exhaust Stacks. OSSM CSAs and Anchor Plates are constructed in ways that provide for angle and tensioning adjustment to adjust compression force against a wall surface.

OSSMs should be constructed from materials that exhibit similar thermal expansion and contraction characteristics as concrete, materials that demonstrate exceptional stiffness over their distributed mass to achieve superior material yield strength, to resist axial, tensile, compression and traverse loading, resist stretch or elongation, strain or shear forces, and resist deformations and embrittlement. OSSMs may be coated to resist other degradations from exposure to atmospheric elements such as infrared and ultra violet light, salt mist, oxidization, cyclic changes in temperature and humidity, ozone, and radiation.

Because the accelerated mass of a structure increases at the higher elevations during a SSE, OSSM Strap and Anchor Plate material properties and or construction may be changed to dampen and overcome the forces. OSSMs constructed from lighter materials will contribute less to overall accelerated mass.

Part No. 16—in FIGS. 12-15 and 17-18 is a perpendicularly flat OSSM Off-Set Compression Strap constructed with all of the attributes of Part number 15 and in addition, fabricated with an offset at either or both ends to allow interconnecting with various segmented combinations and or connecting to various anchor plates (FIG. 1). The offset allows the end(s) of Compression Strap segments to overlap each other, or overlap an anchor plate, and be fastened with conventional fasteners such as rivets, flathead bolts, washers and lock nuts, or (P/N 14 Splines Stud Fastening Assembly).

Part No. 17—in FIG. 14 is an OSSM Anchor Plate constructed with Anchor Holes (P/N 23) to enable the Anchor Plate to be attached to concrete extensions such as Equipment Hatches or Personnel Hatches that extend away from a curved concrete wall for anchoring various CSAs against the wall. The Anchor Plate can also be welded or bonded to steel surfaces. Like a TBAP it can also be constructed with apparatus shown in (FIGS. 5 and 7 thru 9) to enable attachment of various CSAs.

Part No. 18—in FIG. 14 is an OSSM Angled Anchor Plate (AAP) constructed with Anchor Holes (P/N 23) to enable the Anchor Plate to be attached to concrete extensions such as Equipment Hatches or Personnel Hatches that extend away from a curved concrete wall for anchoring various CSAs against the wall. The AAP can also be welded or bonded to steel surfaces. Like an ATBAP it can be constructed with apparatus shown in (FIG. 10) to allow various CSAs to swing away from a concrete wall.

Part No. 19—in FIG. 14 is an OSSM AAP constructed with Anchor Holes (P/N 23) to enable the Anchor Plate to be attached to concrete extensions such as Equipment Hatches or Personnel Hatches that extend away from a curved concrete wall for anchoring various CSAs against the wall. The AAP can also be welded or bonded to steel surfaces. Like an ATBAP it can also be constructed with Splined Stud fastening assemblies (P/N 14) or Angle Clamp tensioning apparatus (FIG. 16 P/Ns 25 and 28) or Self Aligning Pivot apparatus (FIG. 17 P/Ns 30 thru 33) to enable attachment of various CSAs.

Part No. 20—in FIGS. 3-7 and 9 is a Tendon Bearing Anchor Plate Attachment Bolt Assembly (TBAPABA) that fastens an Anchor Plate (thru the Tending Bearing Plate Hole P/N 2) to the Prior Art Anchor Plate Holes in the Tendon Bearing Plate (FIG. 2).

Part No. 21—in FIG. 8, is a Tendon Bearing Anchor Plate Stud Assembly (TBAPSA) that fastens an Anchor Plate (thru the Tending Bearing Plate Hole P/N 2) to the Prior Art Anchor Plate Holes in the Tendon Bearing Plate (FIG. 2). The Stud may be threaded into the threaded Anchor Plate Hole and/or welded/bonded prior to fastening an Anchor Plate to the Tendon Bearing Plate.

Part No. 22—in FIG. 6, is a Wide Tendon Bearing Anchor Plate Anchor Hole that enables the (OSSM Wide Tendon Bearing Anchor Plate P/N 10) to be anchored and fastened directly to the Buttress and/or to each other (with overlay plate having the same hole pattern) via embedded anchor assembly.

Part No. 23—in FIG. 14, is an Anchor Plate Anchor Hole that enables (OSSM Anchor Plate P/N 17 and AAP P/Ns 18 and 19) to be fastened/anchored directly to concrete extensions such as Equipment or Personnel Hatches that extend away from a-curved concrete wall for anchoring various CSAs against the wall with embedded anchors.

Part No. 24—in FIG. 12, is a Tensioning Pivot Alignment Block (TPAB) designed for tensioning anchored OSSM CSAs against a curved concrete surface. The TPAB pivots between (2) HWHSs (P/N 6) on a Hinge Pin (P/N 9) at the end of an OSSM CSA to eliminate bending stresses on a Tensioning Shoulder Bolt Assembly (P/N 25) by self-aligning with a TPAB on an opposing OSSM CSA segment being tensioned (FIG. 1).

Part No. 25—in FIGS. 12, 16 and 18 is a Tensioning Shoulder Bolt Assembly for tensioning OSSM CSAs against a curved concrete surface. The shoulder on the bolt prevents stresses on the threads and helps align the Bolt with mating Angle Clamps or TPABs and aids in rotation during tensioning sequences. To maintain a consistent tension on the OSSMs, the Tensioning Assembly may utilize wave springs, wire compression springs or Belleville washers as needed. Dual washers with anti-friction lubricant between may also be utilized at each end to reduce friction while applying torque during tension sequences.

Part No. 26—in FIG. 12, is a Hinge Pin Hole in a TPAB (P/N 24) that aligns with the center hole in the HWPS (P/N 6). It is sized for insertion of Pivot Pin (P/N 9) and allows the TPAB to pivot.

Part No. 27—in FIG. 12, is a Tensioning Bolt Hole in a TPAB (P/N 24) sized for insertion of Tensioning Shoulder Bolt (P/N 25) for tensioning OSSM CSAs that are attached to an OSSM Anchor Plate against a concrete surface.

Part No. 28—in FIGS. 16 and 18 is an Angle Clamp that is fastened, bonded, welded or molded as an integral part to an OSSM CSA. The Angle Clamp has thru hole(s) that align with thru holes, in mating Angle Clamp(s) on opposing OSSM Compression Strap segments, to insert the Tension Shoulder Bolt Assembly (P/N 25) and clamp or tension OSSM CSAs against a concrete surface (FIG. 1). The Angle Clamp also functions as a stiffener for CSAs.

Part No. 29—in FIG. 18, is an Angle Clamp Tensioning Bolt Hole that aligns with thru holes in mating Angle Clamp(s) on opposing OSSM Compression Strap segments and enables the Tension Shoulder Bolt Assembly (P/N 25) to clamp and tension OSSM CSAs against a concrete surface.

Part No. 30—in FIG. 17, is a Compression Strap Stiffener that is fastened, bonded, welded or molded as an integral part to an OSSM CSA (P/N 15 or 16), ATBAP (P/N 13) (FIG. 1), or AAP (P/N 19), to increase the thickness and stiffen the Strap, and strengthen the Strap for attachment of Shoulder Stud (P/N 33).

Part No. 31—in FIG. 17, is a Self-Aligning Pivot Connector (SAPC), a member of a self-aligning pivot apparatus that interconnects OSSM Compression Strap segments and connects OSSM ATBAPs (P/N 13) and AAPs (P/N 19). The SAPC enables individual CSA segments to self-align with the anchor points of the CSAs during tensioning sequences. The SAPC pivots on the shoulder of (P/N 33) Shoulder Stud Fastening Assembly via Pivot Holes (P/N 32) (FIG. 1).

Part No. 32—in FIG. 17, are Pivot Holes in a SAPC (P/N 31) sized to pivot on the shoulder of (P/N 33 Shoulder Stud Fastening Assembly) enabling the individual OSSM CSA segments to self-align with each other and the anchor points during tensioning sequences.

Part No. 33—in FIG. 17, is a Shoulder Stud Fastening Assembly constructed with a Shoulder Stud that is welded or bonded to an OSSM Compression Strap (P/N 15), ATBAP (P/N 13) (FIG. 1) or AAP (P/N 19) and Compression Strap Stiffener (P/N 30). The SAPC Pivot Holes (P/N 31) ride on the shoulder of the Stud allowing freedom of movement when the Nut and Washer of the Fastening Assembly are tightened to connect a SAPC.

Although this invention has been described with a certain degree of particularity, it is to be understood that the present disclosure has been made by way of example only, and that numerous changes in the detailed construction and the combination and arrangement of parts may be resorted to without departing from the spirit and scope of the invention.

I claim:

1. A system for strengthening a curved, semi-round or round concrete structure comprising:
    outer structural shell members that comprise one or more compression straps constructed to interconnect each other and be tensioned to conform and apply a continuous compression force to a concrete surface of the structure to resist concrete delamination, crack propagation and spalling,
        wherein, said outer structural shell members that conform to the concrete surface, is constructed of material that substantially match thermal expansion and contraction characteristics of concrete to provide said continuous compression force to strengthen the structure.

2. A system for strengthening a curved, semi-round or round concrete structure comprising:
    outer structural shell members constructed to interconnect each other to apply a continuous compression force to a concrete surface of the structure, wherein one or more of the outer structural shell members comprise at least one compression strap allowing the outer structural shell members to be tensioned to conform to the concrete surface; and
    anchor plate having one or more ways for attaching said outer structural shell members to a plurality of structural vertical buttresses with protruding horizontal/hoop tendons that traverse under the concrete surface between, and apply tensioned circumferential compression force to the structure under the concrete surface, allowing said outer structural shell members to apply said continuous compression force to the concrete surface to the structure, wherein one or more of the outer structural shell members that conform to the concrete surface is constructed of material that substantially match thermal expansion and contraction characteristics of concrete to provide said continuous compression force to strengthen the structure.

3. A system for strengthening a structure comprising:
    a plurality of outer structural shell members constructed to interconnect to each other and apply continuous compression force to a concrete surface of the structure;
    one or more of said outer structural shell members is a compression strap constructed in various length, thickness and shape combinations, allowing installation between, around or even behind obstacles such as supports, hangers, pipes, beams, conduits that abut, attach or even traverse through the structure, to conform to a concrete surface with at least one way of being attached;
    wherein, said compression strap is constructed to be attached, connected and interconnected in a way that enables it to be tensioned to apply compression force to the concrete surface, and allows removal for inspection of concrete;
    one or more of said outer structural shell members is an anchor plate constructed to attach said compression strap and anchor to exposed tendons or buttresses or other structural elements that interrupt or protrude from a concrete structure, that are used as an integral part to tension said outer structural shell strap to apply compression force to the outside concrete surface of the structure;
    wherein, one or more of said outer structural shell members that conform to the concrete surface is constructed with materials that maintain a consistent tension on said members, to substantially match the thermal expansion and contraction characteristics of the concrete, providing a continuous compression force to the concrete surface for strengthening the structure.

4. The system for strengthening a structure of claim 3 wherein one or more shell members is constructed to self-align with a self- aligning pivot apparatus pivotally fastened with a shoulder stud fastening assembly that interconnects said shell members to each other to conform and apply continuous compression force to a concrete surface of the structure.

5. The system for strengthening a structure of claim 3 wherein one or more shell members is constructed to overlap each other and be interconnected to each other with low profile conventional fasteners or rivets or splined stud fastening assemblies to conform to a concrete surface of the structure.

6. The system for strengthening a structure of claim 3 wherein one or more shell members is constructed with an angle clamp tensioning apparatus that depending on the embodiment utilize wave springs, wire compression springs, Belleville washers, dual washers over shoulder bolt to maintain a consistent tension on interconnected shell members to apply continuous compression force to a concrete surface on a structure.

7. The system for strengthening a structure of claim 3 wherein said compression strap is constructed with a self-aligning pivot tensioning apparatus, to eliminate bending stresses when tensioning said compression strap, to provide continuous compression force to the concrete surface.

8. The system for strengthening a structure of claim 3 wherein one or more shell members is constructed with a movable attachment pivotally connected by a removable pivot hinge pin, allowing said compression strap to swing away from a concrete surface, for ease of assembly and disassembly and periodic inspection of the outer concrete surface.

9. The system for strengthening a structure of claim 8 wherein said hinge pin is constructed with a hinge pin cap, that depending on the embodiment is threaded to screw on a hinge pin, or constructed with a clip that fastens in a groove or hole for ease of installation, to assure the hinge pin does not fall out, and enable pin removal out the top or bottom of a pivoting apparatus located in and around obstacles.

10. The system for strengthening a structure of claim 3 wherein some of the outer structural shell members have brackets to accommodate installation of load cells to measure said continuous compression force to the concrete surface of the structure.

11. The system for strengthening a structure of claim 3 wherein each of said outer structural shell members has a particular thickness, wherein the particular thickness of structural shell members used in lower locations on the structure have less thickness than structural shell members used on higher locations on the structure, in accordance with end user structural preference or requirement.

12. The system for strengthening a structure of claim 3 wherein said anchor plate constructed to connect exposed tendons, is a tendon bearing anchor plate in one embodiment with attachment assembly that mates with structurally exposed tendon bearing plate, to become an integral part for strengthening a structure, wherein another embodiment, said anchor plate is constructed to become an integral shim to a structural tendon assembly in a structure, wherein another embodiment, said anchor plate is extended to interconnect said outer structural shell for strengthening a structure.

13. The system for strengthening a structure of claim 3 wherein said anchor plate constructed to attach said compression strap and anchor to exposed buttresses or other structural elements, is an angled or flat anchor plate constructed, depending on embodiment, for pivotally attaching or fastening said compression strap constructed to conform to the concrete surface.

\* \* \* \* \*